(12) United States Patent
Banik et al.

(10) Patent No.: US 11,941,409 B2
(45) Date of Patent: Mar. 26, 2024

(54) METHODS, SYSTEMS, AND APPARATUSES FOR A MULTIPROCESSOR BOOT FLOW FOR A FASTER BOOT PROCESS

(71) Applicant: Intel Corporation, Santa Clara, CA (US)

(72) Inventors: Subrata Banik, Bangalore (IN); Asad Azam, El Dorado Hills, CA (US); Jenny M. Pelner, Phoenix, AZ (US); Vincent Zimmer, Issaquah, WA (US); Rajaram Regupathy, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 593 days.

(21) Appl. No.: 16/914,331

(22) Filed: Jun. 27, 2020

(65) Prior Publication Data
US 2021/0326142 A1    Oct. 21, 2021

(51) Int. Cl.
*G06F 9/44* (2018.01)
*G06F 9/4401* (2018.01)

(52) U.S. Cl.
CPC ........ *G06F 9/4403* (2013.01); *G06F 2212/60* (2013.01)

(58) Field of Classification Search
CPC .................................................. G06F 9/4403
See application file for complete search history.

(56) References Cited

U.S. PATENT DOCUMENTS

| | | | |
|---|---|---|---|
| 9,430,372 B2 | 8/2016 | Nachimuthu et al. | |
| 2003/0233533 A1* | 12/2003 | Avraham | G06F 9/4406 713/1 |
| 2004/0098575 A1 | 5/2004 | Datta et al. | |
| 2006/0020758 A1* | 1/2006 | Wheeler | G06F 12/0862 711/137 |
| 2008/0147975 A1 | 6/2008 | Zimmer et al. | |
| 2018/0181758 A1 | 6/2018 | Branco | |
| 2019/0108347 A1* | 4/2019 | Ghetie | G06F 9/4418 |

OTHER PUBLICATIONS

Intel, "Arria® 10 SoC Boot User Guide", Available Online at <2) https://www.intel.com/content/dam/www/programmable/us/en/pdfs/literature/ug/ug-a10-soc-boot.pdf>, UG-1171, Apr. 3, 2019, 44 pages.
Intel, "Firmware Support Package: External Architecture Specification v2.0", Available Online at <4) https://www.intel.com/content/dam/www/public/us/en/documents/technical-specifications/fsp-architecture-spec-v2.pdf>, May 2016, 54 pages.

(Continued)

*Primary Examiner* — Stefan Stoynov
(74) *Attorney, Agent, or Firm* — NICHOLSON DE VOS WEBSTER & ELLIOTT LLP

(57) ABSTRACT

Systems, methods, and apparatuses relating to circuitry to implement a multiprocessor boot flow for a faster boot process are described. In one embodiment, a system includes a hardware processor comprising a processor core, a cache coupled to the hardware processor, storage for hardware initialization code, and a controller circuit to initialize a portion of the cache as memory for usage by the hardware initialization code before beginning execution of the hardware initialization code after a power on of the system.

24 Claims, 20 Drawing Sheets

(56) References Cited

OTHER PUBLICATIONS

Intel., "Open Source Firmware Development Reduce Firmware Booting Time Using Multi-Threaded Environment", Available Online at <3) https://www.intel.com/content/dam/www/public/us/en/documents/white-papers/reduce-firmware-booting-time-whitepaper.pdf>, White Paper, Revision 001, Jan. 2019, 20 pages.

Intel., "Software Development Guide", Available Online at <https://www.intel.com/content/www/us/en/software-developers/intel-txt-software-development-guide.html>, Revision 017.0, Jan. 2021, 181 pages.

Cohen, Peter A., "Chapter 9: The Intel(registered) Architecture Boot Flow", In Quick Boot: A Guide for Embedded Firmware Developers, 2nd Edition, DEG Press, 2017, 28 pages.

European Search Report and Search Opinion, EP App. No. 20212696.7, dated May 31, 2021, 16 pages.

Litz et al., "TCCluster: A Cluster Architecture Utilizing the Processor Host Interface as a Network Interconnect", 2010 IEEE International Conference on Cluster Computing, 2010, pp. 9-18.

Lu et al., "CAR: Using Cache as RAM in LinuxBIOS", Advanced Computing Laboratory, Los Alamos National Laboratory, Oct. 3, 2006, 5 pages.

Nayani et al., "Memory Management in Linux", Desktop Companion to the Linux Source Code, Linux-2.4.19, Version 0.4, May 25, 2002, 393 pages.

Office Action, EP App. No. 20212696.7, dated Aug. 17, 2022, 4 pages.

Office Action, EP App. No. 20212696.7, dated Mar. 16, 2023, 5 pages.

Sun, J., et al., "Embedded Firmware Solutions: Development Best Practices for the Internet of Things", A Handbook for Engineers Firmware Designers & Software Architects, Apress, Jan. 27, 2015, 215 pages.

Summons to Attend Oral Proceedings, EP App. No. 20212696.7, Oct. 5, 2023, 2 pages.

Summons to Attend Oral Proceedings, EP App. No. 20212696.7, Sep. 28, 2023, 9 pages.

* cited by examiner

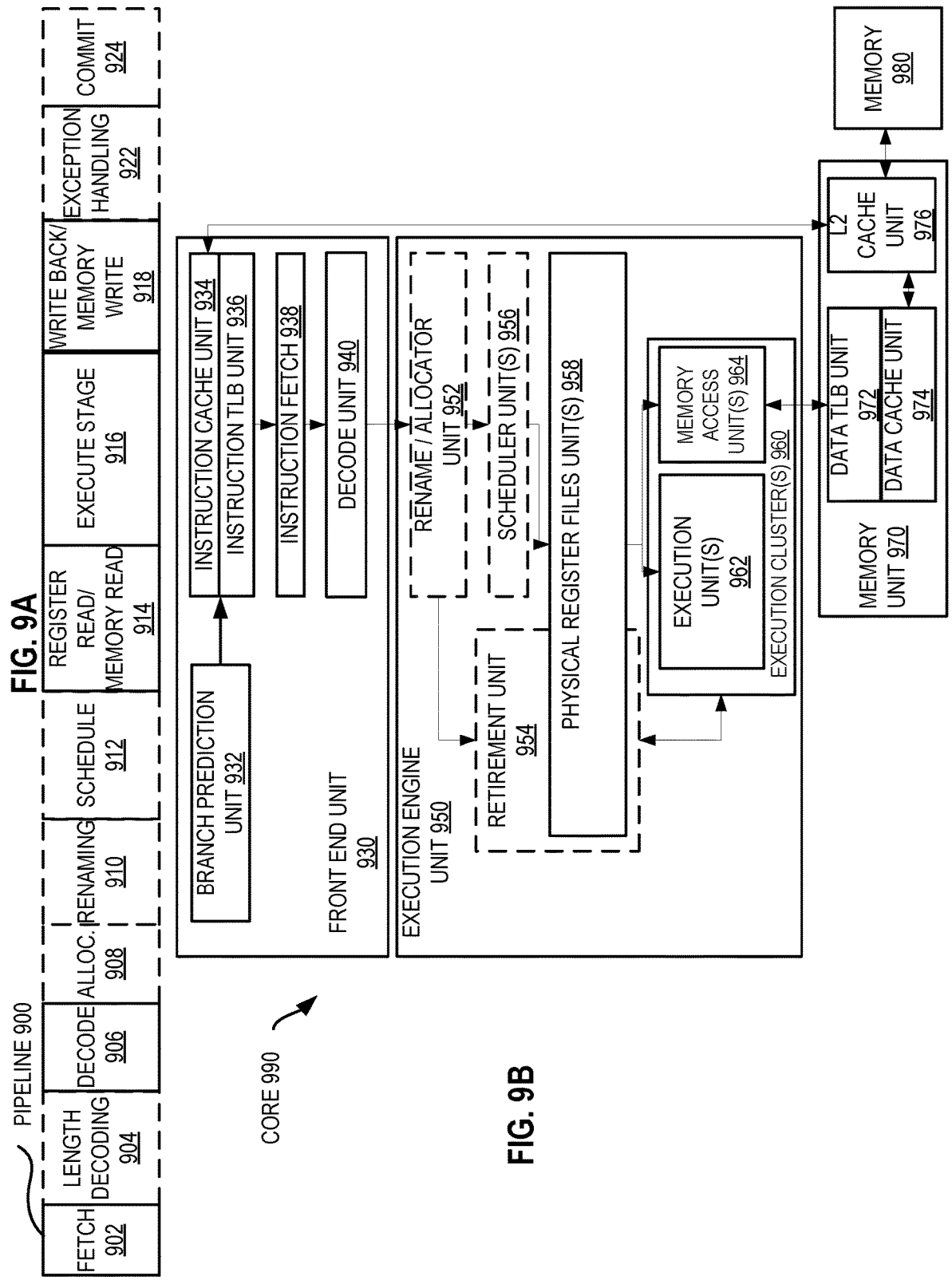

METHODS, SYSTEMS, AND APPARATUSES FOR A MULTIPROCESSOR BOOT FLOW FOR A FASTER BOOT PROCESS

CROSS-REFERENCE TO RELATED APPLICATIONS

The present patent application claims the benefit of India Provisional Patent Application No. 202041016869, filed Apr. 20, 2020, and titled: "Method, System, and Apparatus for a Multiprocessor Boot Flow for a Faster Boot Process", which is incorporated herein by reference in its entirety.

TECHNICAL FIELD

The disclosure relates generally to electronics, and, more specifically, an embodiment of the disclosure relates to circuitry to implement a faster boot process.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions to operate on data, for example, to perform arithmetic, logic, or other functions. A hardware processor may access data in data storage (e.g., memory). A system (e.g., a system on a chip) may include one or more processor cores (e.g., "logical processors").

Figure 1:
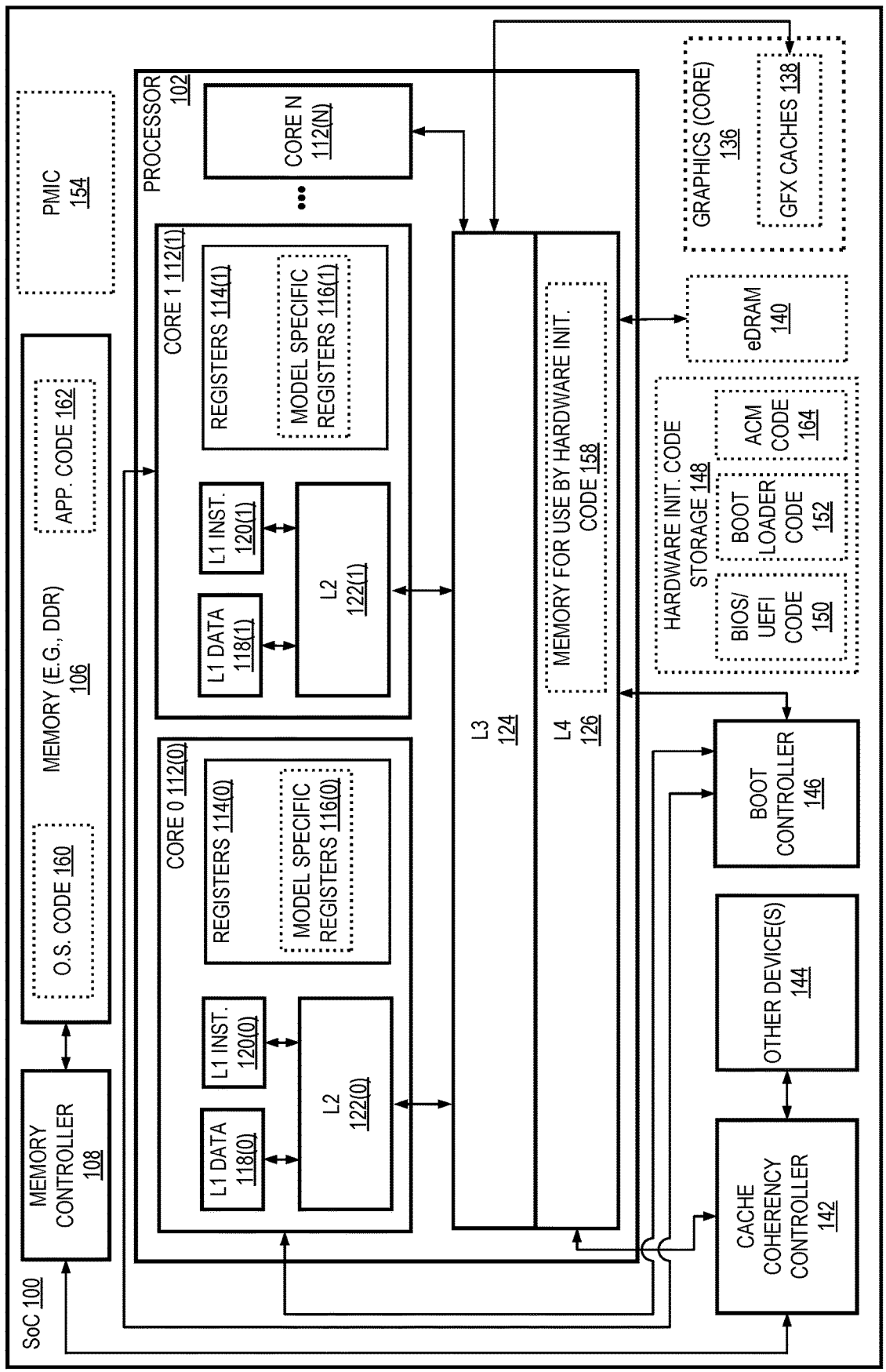
FIG. 1 illustrates a system on a chip that includes a boot controller according to embodiments of the disclosure.

As part of an enhanced user experience, applications using computer systems may demand instant (e.g., perceptibly instant to a human) system boot up time. Faster system response time is a key performance indicator (KPI) that may be used by original equipment manufacturers (OEMs) and original design manufacturers (ODMs) for their product requirements for various computing sectors, for example, personal devices (e.g., smart phone/tablet/laptop), health care (e.g., ultrasound, defibrillators, and patient monitor devices), industrial (e.g., robots changing arms), military, aerospace, and government (MAG) (e.g., firing a missile, fail-safe redundancy on airplanes, or similar single function devices), and/or office/home automation. In certain uses, the average system (e.g., platform) boot time is expected to be less than a threshold (e.g., 500 ms) from a (e.g., Advanced Configuration and Power Interface (ACPI) standard) (e.g., starting at ACPI "mechanical off" (e.g., "G3") state) system state (e.g., with no power applied) until the operating system (OS) hand off. Certain embodiments herein provide an improved boot flow utilizing a boot controller (e.g., circuit) that configures a cache for use as memory for hardware initialization code before executing the hardware initialization code. Turning now to FIG. 1, an example system on a chip (SOC) is depicted.

FIG. 1 illustrates a system on a chip (SoC) 100 that includes a boot controller 146 according to embodiments of the disclosure. The boot controller 146 may be located within processor 102. Depicted SoC 100 illustrates a hardware processor 102 coupled to a memory 106 via memory controller 108. In one embodiment, the memory 106 of SoC 100 is a system memory (e.g., dynamic random-access memory (DRAM)). Memory controller 108 may be included, e.g., to manage memory requests between the processor 102 and memory 106. In one embodiment, memory controller 108 is to provide (e.g., fill) data (e.g., a cache line) for a miss in the cache(s) (e.g., miss in L3 124, L4 126, or other last level cache (LLC) of processor 102). Processor 102 may include one or more processor cores 112, e.g., 0 to N where N is a positive integer. In one embodiment, each of a plurality of processor cores have an instance of the circuitry discussed herein. Depicted core 0 112(0) includes a first level (L1) of data cache 118(0), a first level (L1) of instruction cache 120(0), and a level two (L2) cache 122(0). Depicted core 1 112(1) includes a first level (L1) of data cache 118(1), a first level (L1) of instruction cache 120(1), and a level two (L2) cache 122(1).

In some embodiments, as shown in FIG. 1, processor 102 includes one or more next levels (e.g., level three (L3) cache 124 and level four (L4) cache 126, e.g., with L4 the last level cache (LLC) (e.g., the last cache searched before a data item is fetched from memory 106) that is coupled to, and shared by, one or more (e.g., all) of the cores. In certain embodiments, each of L1 data caches 118, L1 instruction caches 120, L2 caches 122, L3 cache 124, and L4 (e.g., LLC) cache 126 are managed by cache coherency controller 142 (e.g., circuitry), e.g., to cache data (e.g., and/or instructions) according to a specified cache coherency. In certain embodiments, the data (e.g., and/or instructions) stored within the various processor caches are managed at the granularity of cache lines which may be a fixed size (e.g., 64, 128, 512, etc. Bytes in length). Each core 112 may include other components (e.g., as depicted in FIG. 9B), for example, an instruction fetch circuit for fetching instructions (for example, from (e.g., main) memory 106 via memory controller 106 and/or from the caches; a decode circuit (e.g., decoder or decode unit) for decoding the instructions (e.g., decoding program instructions into micro-operations or "µops"); and an execution unit (e.g., execution circuit) for executing the decoded instructions. Core may include a writeback/retire circuit for retiring the instructions and writing back the results. Depicted core 0 112(0) further includes a set of one or more registers 114(0), for example, having one or more model specific (or machine specific) registers 116(0), e.g., as control register(s).

SoC 100 may include one or more other devices 144, e.g., that are also coupled to cache coherency controller 142. Devices 144 may include a device that is to be initialized before memory 106 (e.g., DRAM) initialization is attached to cache, for example, a Converged Security and Management Engine (CSME) device, a generic Serial Peripheral Interface (GSPI) device, an enhanced Serial Peripheral Interface (ESPI) device, etc.

SoC 100 may include graphics circuitry 136 (e.g., a graphics core). In certain embodiments, graphics circuitry 136 includes one or more caches 138, e.g., that are coupled to one or more caches shared with the processor, e.g., L3 cache 124 and/or L4 cache 126. SoC 100 may include an embedded dynamic random-access memory 140 (eDRAM), for example, embedded into SoC 100 with processor 102. In certain embodiments, eDRAM 140 is used as L4 (e.g., LLC) cache 126 (e.g., instead of using an embedded static RAM (eSRAM) for the L4 cache). In certain embodiments, eDRAM 140 is positioned between L3 cache 124 and memory 106 (e.g., DRAM (e.g., Double Data Rate Synchronous DRAM (DDR)), e.g., on a memory bus. SoC 100 may include a power management integrated circuit 154 (PMIC), e.g., to, in response to a power on indication (e.g., pressing of a mechanical on/off switch), provide (e.g., power to the components of the SoC 100.

In certain embodiments, SoC 100 (e.g., internal or external to processor 102) includes hardware initialization code storage 148. The hardware initialization code may be hardware initialization firmware. In certain embodiments, the hardware initialization code from storage 148, when executed by the processor 102, is to cause the booting up of the SoC 100 (e.g., at least the booting up of the hardware processor 102 thereof).

In certain embodiments, the hardware initialization code is responsible for transferring control of the computer (e.g., SoC 100) to a program (e.g., OS) stored in memory coupled to the computer.

In certain embodiments, the hardware initialization code storage 148 includes BIOS and/or UEFI code from storage 150 and boot loader code from storage 152. In certain of those embodiments, the BIOS and/or UEFI (e.g., boot ROM) code is executed as a first stage, and then the boot loader code is executed as a second stage. As one example, BIOS code is according to a BIOS standard. As another example, UEFI code is according to a UEFI standard.

In certain embodiments, the BIOS and/or UEFI code brings the SoC 100 (e.g., processor 102 thereof) out of (e.g., cold) reset, puts the processor into a known and stable state, and finds the second-stage boot loader code (e.g., from storage 152) and passes control to the next stage. In one embodiment, the BIOS and/or UEFI (e.g., boot ROM) code is only aware of the second-stage boot loader code 152 and not aware of any potential subsequent software stages. In certain embodiments, during this time, the BIOS and/or UEFI (e.g., boot ROM) code handles any error conditions.

In certain embodiments, the boot loader code (e.g., being passed control of the SoC (e.g., processor) when the BIOS and/or UEFI code stage is complete) then locates and loads (e.g., for execution by the processor) the next stage(s) of software (e.g., O.S.) and so on. In one embodiment, before control is passed to the boot loader code, it is decrypted and/or authenticated if secure boot is enabled.

In certain embodiments, BIOS and/or UEFI (e.g., boot ROM) code, when executed, initializes certain hardware of the SoC, checks integrity, and initializes the (e.g., first level) boot loader code. In certain embodiments, the boot loader code is, e.g., after being called at the completion of BIOS and/or UEFI (e.g., boot ROM) code execution, executed to cause a handoff of control of the SoC (e.g., processor) to the operating system executing of the SoC. In one embodiment, the boot loader code knows where (e.g., the memory location of) the OS kernel image is stored in memory, for example, and loads the OS kernel image for execution.

Although BIOS and/or UEFI (e.g., boot ROM) code storage 150 and boot loader code storage 152 are shown together, in another embodiment the BIOS and/or UEFI (e.g., boot ROM) code storage 150 is within processor 102 and the boot loader code storage 152 is separate from the processor 102 (e.g., in storage 148 of SoC 100).

In certain embodiments, once boot is complete, certain control of the SoC transfers to executing OS code 160 (and/or application code 162). In certain embodiments, SoC 100 includes authenticated code module (ACM) code 164. In one embodiment, hardware initialization code storage 148 includes ACM code 164. In certain embodiments, ACM code 164 supports the establishment of a measured environment that enables the capability of an authenticated code execution mode, for example, with the ACM code loaded into the processor and executed using a tamper resistant mechanism. In one embodiment, authentication is achieved by a digital signature in the header of the ACM code, for example, where the processor calculates a hash of the ACM and uses the result to validate the signature, e.g., such that the processor will only initialize processor state or execute the ACM if it passes authentication.

Figure 2:
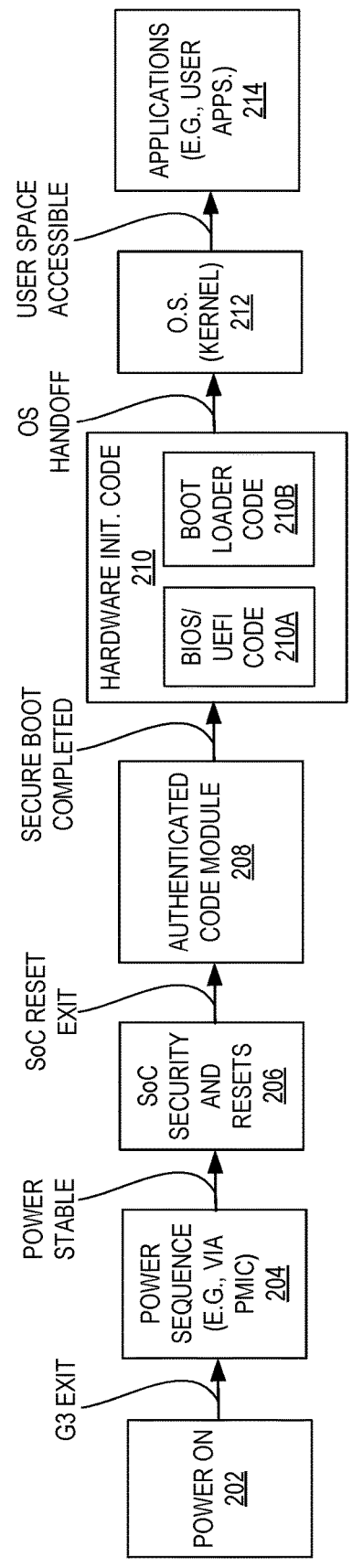
FIG. 2 illustrates an example boot flow according to embodiments of the disclosure.

FIG. 2 illustrates an example boot flow 200 according to embodiments of the disclosure. Depicted flow 200 shows one embodiment of an architecture (e.g., Intel® architecture (IA)) platform boot path. For example, from an initial "mechanical off" state (e.g., ACPI G3) to a working state (for example, ACPI G0 sleep state S0 (e.g., working S0 state, and not S0 lower-power idle (e.g., "standby") or partial SoC sleep) boot time flow. The boot flow 200 may include the pre-power (for example, all rails and clock stabilization, e.g., real time clock (RTC)), pre-reset (e.g., power sequencing, reset/security, authenticated code module (ACM), microcode (ucode)/power management code (pcode), etc.), and post central processing unit (CPU) reset (e.g., boot loader) boot path components.

Depicted boot flow 200 includes receiving a power on at 202 (e.g., a G3 state exit), an initial power sequence 204 (e.g., as performed by a PMIC), SoC security and resets 206 (e.g., with the SoC (e.g., reset manager thereof) generating module reset signals based on reset requests from the various sources in the hardware processor system (e.g., processor 102) and any storage (e.g., storage 148), and software writing to the module-reset control registers, e.g., with the reset manager exiting SoC reset only when the secure fuses have been loaded and validated), authenticated code module 208 executed to ensure secure boot is completed, and then to hardware initialization code 210 (for example, such that BIOS and/or UEFI code 212A from storage 150 and boot loader code 212B from storage 152 are executed, e.g., in series), after the OS handoff, the O.S. may then execute 212, and one or more (e.g., user) applications may then be executed 214 (e.g., under the control of the OS). Note that blocks 202-214 are merely examples and more or less blocks may be utilized in a boot flow. In certain embodiments, (e.g., in contrast to BIOS/UEFI code 210A) execution of authenticated code module 208 is an (e.g., additional) additional step included to ensure security as per a guideline (for example, a Boot Guard technology, e.g., that is a combination of BIOS guard, trusted execution technology (TXT), and ACM) used to validate other firmware blocks). In one embodiment, Trusted Execution Engine (TXE) firmware is the code executed for TXT, e.g., to bring up TXE and expose runtime security services such as firmware Trusted Platform Module (fTPM) and Platform Protection Technology with Boot Guard. In certain embodiments, Boot Guard in TXE firmware loads and authenticates other firmware components during boot. In certain embodiments, processor (e.g., IA) firmware communicates with TXE firmware through a Host Embedded Controller Interface (HECI). In certain embodiments, firmware is provided by a manufacturer and signed with the manufacturer's private key.

In certain embodiments, the most time-consuming phase of a total boot path is the execution of the code (e.g., firmware) used to perform hardware initialization during the booting process (e.g., sometime referred to as the Basic Input/Output System (BIOS) process), hence making it a critical phase to optimize to provide a fast boot experience. In certain embodiments, the size of the hardware initialization code (e.g., BIOS/UEFI code and/or boot loader code) is growing with more workloads to execute.

Embodiments herein provide an improved boot flow utilizing a boot controller (e.g., circuit) that configures a cache for use as memory (e.g., memory 158 in FIG. 1) for hardware initialization code before executing the hardware initialization code, for example, before entry into any of hardware initialization code (e.g., BIOS code or UEFI code). In one embodiment, block of memory 158 is sized (e.g., pre-allocated) to store input, output, and block device, e.g., about 64 MB-256 MB in size.

Figure 3:
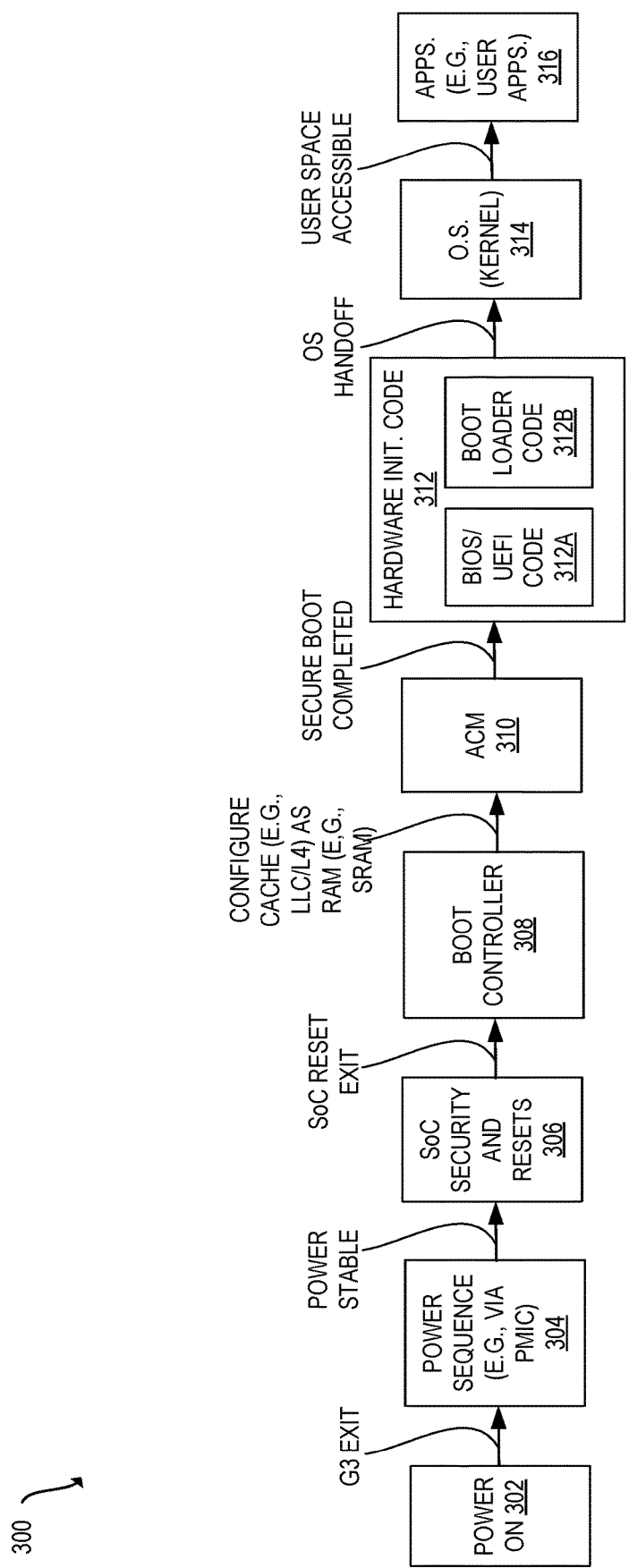
FIG. 3 illustrates an example boot flow utilizing a boot controller that configures a cache for use as memory for hardware initialization code before executing the hardware initialization code according to embodiments of the disclosure.

FIG. 3 illustrates an example boot flow 300 utilizing a boot controller 308 that configures a cache for use as memory for hardware initialization code before executing the hardware initialization code 312 according to embodiments of the disclosure. Depicted flow 300 shows one embodiment of an architecture (e.g., Intel® architecture (IA)) platform boot path. For example, from an initial "mechanical off" state (e.g., ACPI G3) to a working state (for example, ACPI G0 sleep state S0 (e.g., working S0 state, and not S0 lower-power idle (e.g., "standby") or partial SoC sleep) boot time flow. The boot flow 300 may include the pre-power (for example, all rails and clock stabilization, e.g., real time clock (RTC)), pre-reset (e.g., power sequencing, reset/security, authenticated code module (ACM), microcode (ucode)/power management code (pcode), etc.), and post central processing unit (CPU) reset (e.g., boot loader) boot path components.

Depicted boot flow 300 includes receiving a power on at 302 (e.g., a G3 state exit), an initial power sequence 304 (e.g., as performed by a PMIC), SoC security and resets 306

(e.g., with the SoC (e.g., reset manager thereof) generating module reset signals based on reset requests from the various sources in the hardware processor system (e.g., processor 102) and any storage (e.g., storage 148), and software writing to the module-reset control registers, e.g., with the reset manager exiting SoC reset only when the secure fuses have been loaded and validated), boot controller 308 is to initialize a portion of a cache (e.g., L4 cache) for use by the hardware initialization code 312, authenticated code module 310 executed to ensure secure boot is completed, and then to hardware initialization code 312 (for example, such that BIOS and/or UEFI code 312A from storage 150 and boot loader code 312B from storage 152 are executed via use of the portion of the cache (e.g., L4 cache) initialized by boot controller 308, e.g., in parallel), after the OS handoff, the O.S. may then execute 314, and one or more (e.g., user) applications may then be executed 316 (e.g., under the control of the OS). Note that blocks 302-316 are merely examples and more or less blocks may be utilized in a boot flow.

Also, in certain embodiments, the entire (e.g., BIOS/UEFI) hardware initialization (e.g., boot) takes place in a single threaded (e.g., single core executing of a plurality of cores) environment, and results in independent (e.g., input/output (I/O)) initialization waiting for its execution time or turn. In certain embodiments, hardware initialization code (e.g., BIOS firmware) runs on a single threaded environment because there is not enough pre-initialized memory available at reset and/or (e.g., limited) memory at reset that does not allow a multi-threaded environment. Certain embodiments herein provide for a faster boot process without using cache-as-random-access-memory (RAM) (CAR) that is setup during execution of the hardware initialization code, e.g., with CAR setup being complex and limited. Certain embodiments herein provide for a faster boot process without having fixed (e.g., static) memory (e.g., static random-access memory (SRAM)) provided for boot (e.g., firmware) space usage. Certain embodiments herein provide for a faster boot process without using the last level cache (LLC) within a processor (e.g., but can use the LLC of a SoC).

In one embodiment, a platform's boot process does not have pre-programmed memory at (e.g., CPU) reset and is provided with a very limited cache memory size leading to an ineffective boot method with a single core processor at reset. This limits this system's ability to parallelize the boot steps within the hardware initialization code (e.g., BIOS/FW) execution, forcing it to complete the boot up sequence in a serial fashion which results in much longer boot times.

Certain embodiments herein provide for a compute architecture memory system augmented with several levels of caches, e.g., as shown in FIG. 1. As one example, a memory system includes:

Read-only memory path for (e.g., Open Computing Language (OpenCL) standard) images which includes level-1 (L1) and a level-2 (L2) sampler caches.

Level-3 (L3) data cache as a slice-shared (e.g., by multiple cores) asset. In one embodiment, all read and write actions on (e.g., OpenCL) buffers (e.g., caches) flow through the L3 data cache in units of (e.g., 64-byte wide) cache lines. In one embodiment, the L3 cache includes sampler read transactions that are missing in the L1 and L2 sampler caches, and also supports sampler writes.

System-on-a-chip (SoC) memory hierarchy may include a (e.g., larger) Last-Level Cache (LLC) (e.g., an LLC which is shared between CPU and a graphics processing unit (GPU) (e.g., graphics core 136), system dynamic random-access memory (DRAM) 106, and (optionally) embedded DRAM (eDRAM) 140.

In certain embodiments, a (e.g., level 4 (L4) and/or LLC) shared cache is of larger size than for a processor (e.g., CPU) or a GPU only, e.g., to improve performance of hybrid ecosystem with CPU(s) and GPU(s). However, a key disconnect in certain embodiments of this is a lack of visibility of this large chunk of (e.g., L4 and/or LLC) cache memory to the boot process that thereby makes the system resource inefficient. Embodiments herein address this disconnect in the memory hierarchy during the boot stage of the system (e.g., prior to executing hardware initialization code, e.g., BIOS/UEFI code).

In certain embodiments, the user experience key performance indicators involve a faster response of a system including a faster boot time. Certain embodiments herein provide a faster ecosystem boot process, e.g., that does not only run in a single core due to lack of visibility to cache memory during boot time and thus limits the capability of a multicore processor system. For example, certain embodiments herein allow hardware initialization code (e.g., firmware) to run in parallel, e.g., instead of running sequentially leading to slower boot time and ineffective usage of processor power. Embodiments herein are directed to effectively using processor power and system resources to enhance faster boot response, e.g., to provide a better user experience and not waste resources. Embodiments herein allow for use of multiple processing cores in a boot process, for example, in contrast to the entire boot happening (e.g., boot code executing) on a single core environment where initial boot happens with single core (e.g., microprocessor) until memory is available for all processors such that the boot sequence is completed with only a single processing core. Embodiments herein allow for a parallelization of the boot process (e.g., in executing a hardware and/or firmware initialization sequence).

Embodiments herein enhance a boot process by extending a (e.g., LLC/L4) cache memory at reset to enable a multicore environment and enable hardware initialization (e.g., boot) code (e.g., firmware) to parallelize the boot block. In certain embodiments, a SoC's hardware is modified/selected to treat (e.g., package) cache as static RAM (SRAM) and/or provide a larger pre-initialized memory at reset for boot firmware. In certain embodiments, multiple cores of a processor are available at reset and enable the boot hardware initialization (e.g., boot) code (e.g., firmware) to run the boot block in parallel to reduce the boot time. Embodiments herein utilize an L4 cache (e.g., persistent memory such as but not limited to, Intel® Optane™ persistent memory) as memory for use by the hardware initialization code, e.g., before secure boot (e.g., via an ACM). In one embodiment, the access time for (e.g., L4) cache is (e.g., significantly) less than the access time for system memory (e.g., DRAM). Embodiments herein provide a section of (e.g., L4) cache to be visible (e.g., at boot time), for example, to enable multicore execution of hardware initialization code via that section of cache (e.g., such that execution of the hardware initialization code is not limited to a single core (e.g., to a single "bootstrap processor (core)") and/or enable parallel execution of hardware initialization code to optimize boot time and support a faster boot time compared to a single core (e.g., not requiring a serialized execution of the (e.g., entire) hardware initialization code).

Certain embodiments herein include a (e.g., larger than about 128 GB, 256 GB, and 512 GB) on-package (e.g., L4) cache (e.g., having an access time that is much less than a DRAM access time, e.g., with a DRAM size of about 4 GB to 32 GB) which is used to improve hardware initialization code (e.g., firmware) and thus boot time. Certain embodiments herein provide for (e.g., more) pre-initialized memory at (e.g., power on) reset, for example, as part of a processor (e.g., CPU) reset process (e.g., but not part of a hardware initialization processes (e.g., BIOS process or UEFI process)). Certain embodiments herein provide for (e.g., more) pre-initialized memory at reset to nullify legacy (e.g., x86) BIOS/UEFI assumptions and/or make a faster and more efficient BIOS/UEFI solution for modern device use cases, such as, but not limited to, automotive in-vehicle infotainment (IVI) (e.g., turn on rear view camera within a faster period of time), household robots, industrial robots, etc.

The below discusses two categories of embodiments, (1) making (e.g., L4) cache available as part of SRAM and (2) enabling multi-threaded (e.g., multiple core) environment using shared (e.g., L4) cache as SRAM at reset. In certain embodiments of (1), hardware initialization code (e.g., firmware) is to know SRAM base and limit (max) to make use of it, e.g., where hardware initialization code is to use (e.g., L4) cache for all regular operations like resource allocation etc. instead of DRAM based resource. Certain of those embodiments ensure pre-programmed SRAM is available for hardware initialization code consumption (e.g., use by the code when it executes) and/or access time for the (e.g., L4) cache is much faster than the DRAM access time which will improve boot time (e.g., by decreasing the total time to execute hardware initialization code). In certain embodiments of (2), all cores (e.g., (e.g., bootstrap processor (BSP) and application processors (APs)) are available at reset (e.g., before execution of the hardware initialization code. Certain of those embodiments thus allow for design/redesign of hardware initialization code (e.g., firmware) to make use of multi core environment, e.g., with the cores having dependency over a significantly bigger memory available at reset.

In certain embodiments, the execution of a processor identification instruction (e.g., CPUID instruction) or reading of a (e.g., dedicated) model specific (or machine specific) register (MSR) indicates if the functionality discussed herein is available (e.g., for a particular system/processor).

The following discussion of the two categories of embodiments includes methods (e.g., and hardware) that, in certain embodiments, allows the entire (e.g., BIOS or UEFI) hardware initialization (e.g., boot) to take place in a multi-threaded (e.g., multiple core) environment.

In certain embodiments, platform boot time of a device refers to the total time it takes to show something on the screen of the device after the device is instructed to turn on (e.g., mostly comprised of the BIOS or UEFI booting time (and time for boot loader) plus the OS booting time).

Example (1): Making (e.g., L4) Cache Available as Part of SRAM

Figure 4:
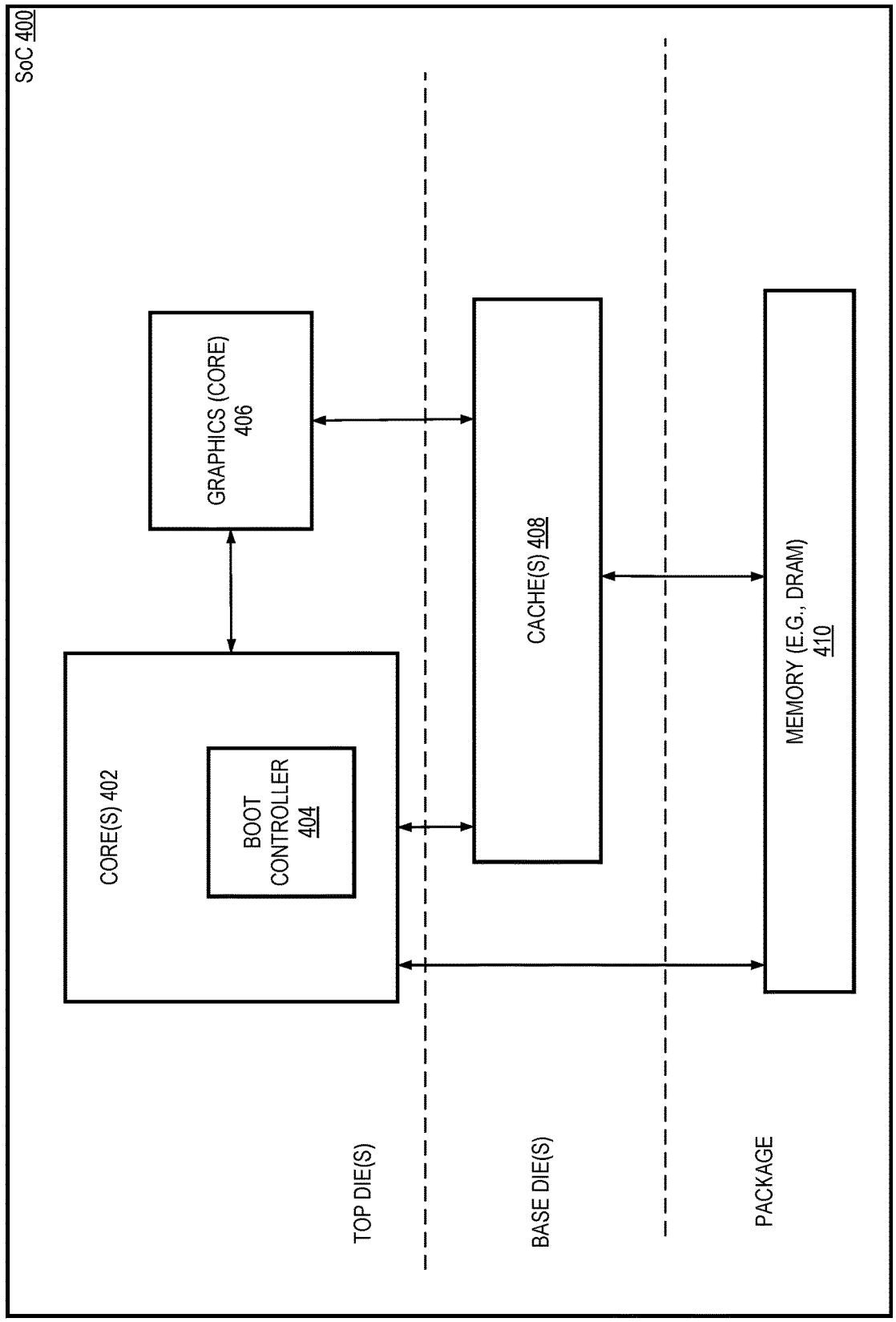
FIG. 4 illustrates a system on a chip that includes a (e.g., L4) cache according to embodiments of the disclosure.

FIG. 4 illustrates a system on a chip (SoC) 400 that includes a (e.g., L4) cache 408 according to embodiments of the disclosure. Depicted SoC 400 includes one or more cores 402 (e.g., and a boot controller 404 as discussed herein), graphics circuitry 406 (e.g., GFX core), and cache 408 shared by one or more cores 402 and graphics circuitry 406. Depicted core(s) 402 and cache(s) 408 are coupled to memory 410 (e.g., DRAM). For example, with one or more cores 402 and graphics circuitry 406 in a first die(s) of the SoC 400, the cache 408 initialized by the boot controller 404 in a base die(s), and memory 410 (e.g., DRAM) in the package of SoC 400.

Thus, in certain embodiments, the (e.g., L4) cache 408 is shared by (e.g., data) processors and graphics processors, e.g., such that the shared cache (e.g., in the base die of the SoC) is significantly larger in size (e.g., having a size of about 400 MB-700 MB) than a cache only used by a (e.g., data) processor. In certain embodiments, one or more coherent memory interfaces (CMIs) are utilized as a coupling between a cache and another component (e.g., CPU and/or GPU). In certain embodiments, a coupling between CPU (e.g., core 402) and GPU 406 is according to a Computer Express Link (CXL) standard.

The following are example hardware & firmware design details for (1). System memory used during a hardware initialization (e.g., boot) (e.g., hardware initialization code) phase may be very limited. One use case of system memory is to allocate resources for devices (e.g., devices coupled together according to a Peripheral Component Interconnect Express (PCI Express) standard) and read kernel blocks from boot devices before booting to an operating system. In one embodiment, a certain amount of (e.g., about 256 MB-384 MB of) system memory (e.g., initialized by a boot controller) is allocated for hardware initialization code to perform device initializations in a pre-boot environment. In certain embodiments, a system (e.g., auxiliary processor core or controller) is to initialize a portion of shared (e.g., L4) cache (as per the discussion herein) for use (e.g., as SRAM) for platform hardware initialization code usage. Optionally, include an indication (e.g., via model specific (or machine specific) register (MSR)) of the SRAM physical start and limit for hardware initialization code design. In certain embodiments, the hardware initialization code flow is modified to refer to a static memory resource for (e.g., PCI) devices to avoid long waiting time for DRAM based memory training (e.g., about 30 seconds in first boot and about 60-70 milliseconds (ms) in consecutive boots). For security reason, additional security lockdown may be provided on top of the SRAM range, e.g., disable/lockdown the "(e.g., L4) cache configured as SRAM" range before booting to OS, e.g., where once disabled/locked, that cannot be overridden without platform reset. In one embodiment, a firmware support package (FSP) is to handle this lockdown with an "End of Firmware" boot event.

Certain embodiments of (1) utilize the below: hardware changes to use package (e.g., L4) cache as SRAM for hardware initialization code accesses, e.g., to provide a much larger pre-initialized memory at (e.g., SoC) reset for hardware initialization code to utilize. Firmware flows can also be independent of a DRAM memory training which takes a longer time to initialize, e.g., where access to (e.g., L4) cache memory range is faster than DRAM memory access.

Figure 5:
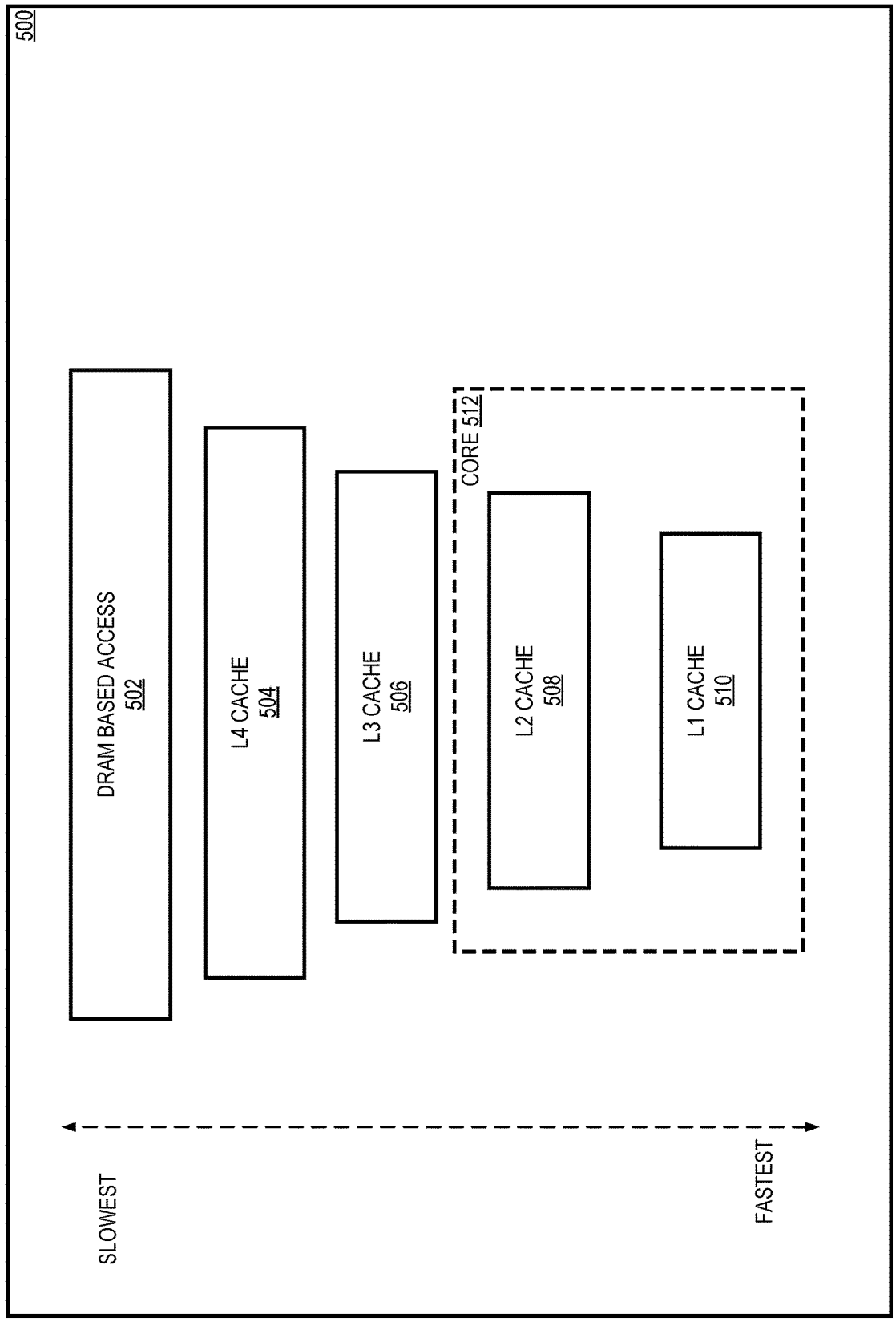
FIG. 5 illustrates example response times for DRAM and a plurality of caches according to embodiments of the disclosure.

FIG. 5 illustrates example response times 500 for DRAM 502 and a plurality of caches 504, 506, 508, 510 according to embodiments of the disclosure. Caches may include a L1 cache 510, L2 cache 508 (e.g., both together in core 512), L3 cache 506, and L4 cache 504.

As noted above, in certain embodiments it is desirable to utilize cache instead of DRAM based memory accesses owing to the longer time that the DRAM access takes relative to a cache access.

Figure 6A:
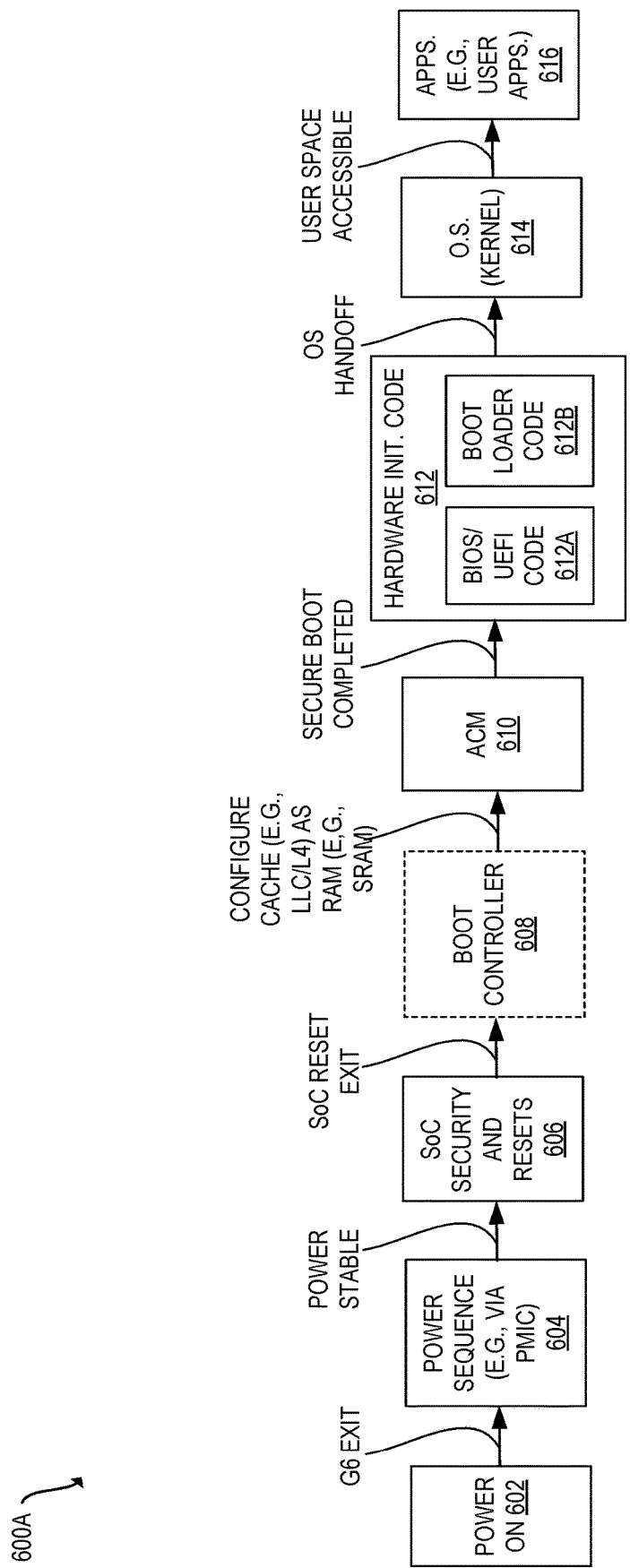
FIG. 6A illustrates an example boot flow according to embodiments of the disclosure.

FIG. 6A illustrates an example boot flow 600A according to embodiments of the disclosure. Depicted flow 600A shows one embodiment of an architecture (e.g., Intel® architecture (IA)) platform boot path. For example, from an initial "mechanical off" state (e.g., ACPI G3) to a working state (for example, ACPI G0 sleep state S0 (e.g., working S0 state, and not S0 lower-power idle (e.g., "standby") or partial SoC sleep) boot time flow. The boot flow 600A may include the pre-power (for example, all rails and clock stabilization, e.g., real time clock (RTC)), pre-reset (e.g., power sequencing, reset/security, authenticated code module (ACM), microcode (ucode)/power management code (pcode), etc.), and post central processing unit (CPU) reset (e.g., boot loader) boot path components.

Depicted boot flow 600A includes receiving a power on at 602 (e.g., a G3 state exit), an initial power sequence 604 (e.g., as performed by a PMIC), SoC security and resets 606 (e.g., with the SoC (e.g., reset manager thereof) generating module reset signals based on reset requests from the various sources in the hardware processor system (e.g., processor 102) and any storage (e.g., storage 148), and software writing to the module-reset control registers, e.g., with the reset manager exiting SoC reset only when the secure fuses have been loaded and validated), optionally) boot controller 608 is to initialize a portion of a cache (e.g., L4 cache) for use by the hardware initialization code 612, authenticated code module 610 executed to ensure secure boot is completed, and then to hardware initialization code 612 (for example, such that BIOS and/or UEFI code 612A from storage 150 and boot loader code 612B from storage 152 are executed via use of the portion of the cache (e.g., L4 cache) initialized by boot controller 608, e.g., in parallel), after the OS handoff, the O.S. may then execute 614, and one or more (e.g., user) applications may then be executed 616 (e.g., under the control of the OS). Note that blocks 602-616 are merely examples and more or less blocks may be utilized in a boot flow.

Figure 6B:
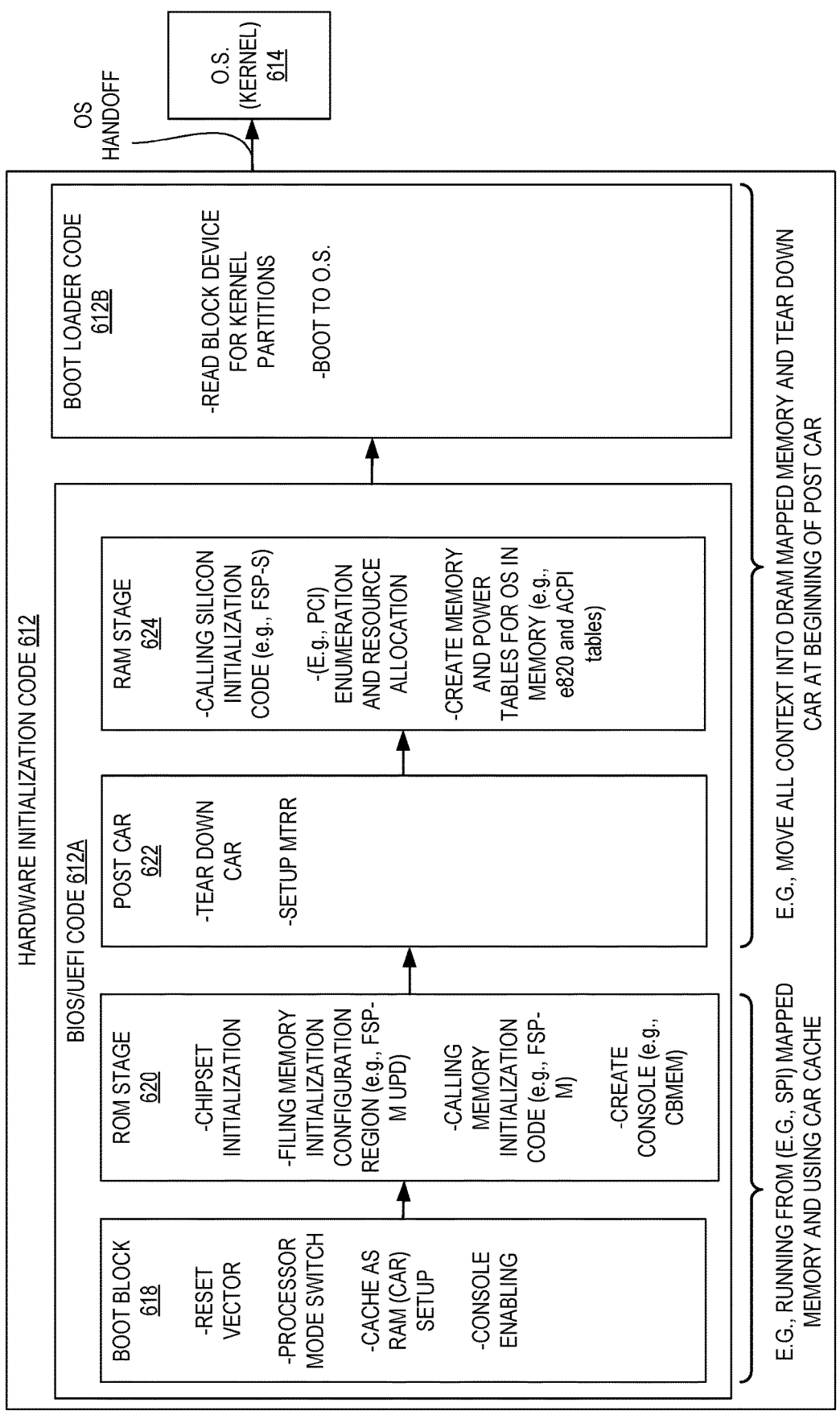
FIG. 6B illustrates an example flow for hardware initialization code of FIG. 6A without configuring cache (e.g., L4/LLC) as random-access memory (RAM) (e.g., SRAM) before running hardware initialization code according to embodiments of the disclosure.

FIG. 6B illustrates an example flow 600B for hardware initialization code of FIG. 6A without configuring cache (e.g., L4/LLC) as random-access memory (RAM) (e.g., SRAM) before running hardware initialization code 612 according to embodiments of the disclosure. In flow 600B, BIOS/UEFI code 612A includes a boot block 618, and ROM stage 620 (e.g., ROM being the hardware initialization storage 148 in FIG. 1), post cache-as-RAM (CAR) 622, and RAM stage 624 (e.g., for memory 106 in FIG. 1). For example, with boot block 618 including reset vector, processor mode switch, setting up CAR, and console enabling. For example, with ROM stage 620 including (e.g., processor) chipset initialization, filing memory initialization configuration regions (e.g., FSP-M UPD), calling memory initialization code (e.g., FSP-M), and creating a console (e.g., CBMEM). For example, with post CAR stage 622 including tearing down (e.g., removing) CAR and setting up memory type range registers (MTRRs). For example, with RAM stage 624 calling silicon initialization code (e.g., FSP-S), (e.g., PCI) enumeration and resource allocations, and creating memory and power tables for the OS in memory (e.g., e820 and ACPI tables).

In certain embodiments, once BIOS/UEFI code 612A has executed, it causes boot loader code 612B to execute. For example, boot loader code 612B executing to cause a read of block device for kernel partitions, and booting to OS.

In certain embodiments, memory type range registers (MTRRs) are a set of processor supplementary capabilities control registers that provide system software with control of how accesses to memory ranges by the processor (e.g., CPU) are cached.

In certain embodiments, a firmware support package (FSP) is a binary distribution of silicon initialization code, for example, with each FSP module containing a configurable data region which can be used by the FSP during initialization. In certain embodiments, this configuration region is a data structure called the Updateable Product Data (UPD) and will contain the default parameters for FSP initialization, e.g., with the UPD data structure only used by the FSP when the FSP is being invoked. In certain embodiments, there are a FSP-M: Memory initialization phase to initialize the permanent memory along with any other early silicon initialization, a FSP-S: Silicon initialization phase to complete the silicon initialization including processor (e.g., CPU) and input/output (I/O) controller initialization, and a FSP-T: Temporary RAM initialization phase to initialize the temporary RAM along with any other early initialization. In certain embodiments, e820 is shorthand for the facility by which the BIOS/UEFI of a (e.g., x86-based) computer system reports the memory map to the operating system or boot loader. In one embodiment, it is accessed via the int 15 h call, by setting the AX register to value E820 in hexadecimal and reports which memory address ranges are usable and which are reserved for use by the BIOS/UEFI.

In certain embodiments, BIOS/UEFI is to load the ACPI tables in system memory. ACPI table may indicate the available computer hardware components and functions to the OS kernel, for example, indicate the available computer hardware components, e.g., to allow the OS to perform power management by (for example) putting unused components to sleep, and to perform status monitoring.

In certain embodiments of FIG. 6B, boot block 618 and ROM stage 620 are run from mapped memory (e.g., according to a Serial Peripheral Interface (SPI) standard) and using CAR cache that is setup by BIOS/UEFI code 612A (e.g., boot block 618 thereof). In certain embodiments of FIG. 6B, post CAR 622 through boot loader code 612B utilize a move of all context into DRAM mapped memory and a tear down of CAR.

In the depicted embodiment, once the hardware initialization code 612 is complete, the OS handoff is performed to transfer control of the system (e.g., processor) to the OS 614 (e.g., OS kernel).

Figure 6C:
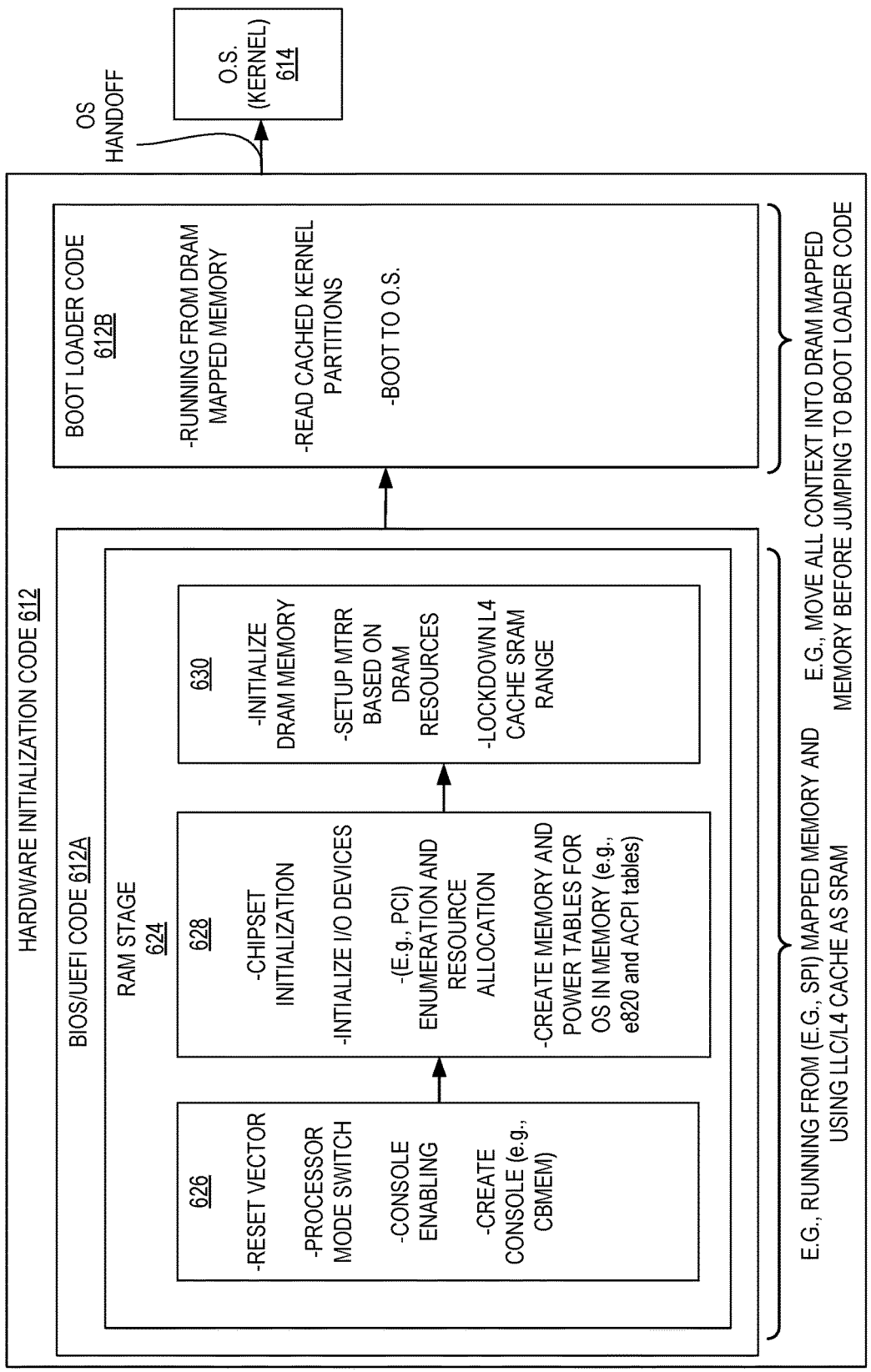
FIG. 6C illustrates an example flow for hardware initialization code of FIG. 6A with configuring cache (e.g., L4/LLC) as random-access memory (RAM) (e.g., SRAM) before running hardware initialization code according to embodiments of the disclosure.

FIG. 6C illustrates an example flow 600C for hardware initialization code of FIG. 6A with configuring cache (e.g., L4/LLC) (e.g., by boot controller 608) as random-access memory (RAM) (e.g., SRAM) before running (e.g., entering) hardware initialization code 612 according to embodiments of the disclosure. In flow 600C, BIOS/UEFI code 612A includes a RAM stage 624. For example, with RAM stage 624 comprising a subblock 626 including reset vector, processor mode switch, console enabling, and creating a console (e.g., CBMEM), a subblock 628 including (e.g., processor) chipset initialization, initializing I/O devices, (e.g., PCI) enumeration and resource allocations, and creating memory and power tables for the OS in memory (e.g., e820 and ACPI tables), and subblock 630 including initializing DRAM memory, setting up MTRR based on DRAM resources, and locking down the portion of the (e.g., L4) cache used as memory for the hardware initialization code (e.g., SRAM range).

In certain embodiments, once BIOS/UEFI code 612A has executed, it causes boot loader code 612B to execute. For example, with boot loader code 612B to cause running from DRAM mapped memory, read of cached kernel partitions, and boot to OS.

In certain embodiments, RAM stage 624 is run from (e.g., SPI) mapped memory and using (e.g., L4) cache as memory (e.g., SRAM) and all context is moved into DRAM mapped memory before jumping to boot loader code 612B from BIOS/UEFI code 612A.

In the depicted embodiment, once the hardware initialization code 612 is complete, the OS handoff is performed to transfer control of the system (e.g., processor) to the OS

614 (e.g., OS kernel). An example security policy is to lock down that SRAM memory range used by the hardware initialization code before booting to operating system.

As one example, the embodiment of FIG. 6C results in a time savings compared to the embodiment depicted in FIG. 6B, and thus a faster boot.

Certain category (1) embodiments allow early hardware initialization code stages (e.g., before DRAM initialization) to be avoided in order to reduce the footprint of the hardware initialization code, e.g., without using cache-as-ram (CAR) ("tempRAM init") in BIOS/UEFI flow and reducing complicated assembly programming in boot loader space. Certain category (1) embodiments allow CPU, chipset, and PCI enumeration to be performed early without being dependent on DRAM initialization. Certain category (1) embodiments do not utilize the time and resources to perform a CAR tear down. Certain category (1) embodiments avoid switching between temporary memory (CAR) to permanent memory (e.g., DRAM based) in boot loader space, e.g., the entire boot loader execution can be driven out of (e.g., SRAM based) fixed memory. Certain category (1) embodiments allow DRAM initialization at end of boot loader boot sequence to make sure payload or OS can use DRAM based resources for higher memory requirement. BIOS may still run on a single threaded environment, e.g., with further boot time optimization added for a multiple threaded environment as discussed in reference to the category (2) embodiments herein.

Example (2): Enable Multi-Threaded (e.g., Multiple Core) Environment Using Shared (e.g., L4) Cache as SRAM at Reset Certain category (2) embodiments use shared (e.g., L4) cache as a larger and faster memory available at reset, and modify the hardware initialization code to utilize those pre-initialized memory rather than define a hardware initialization code (e.g., BIOS or UEFI) flow which has a dependency on DRAM resources. Certain embodiments of this method make use of a multi-threaded (e.g., multiple core) environment at pre-boot stage to achieve fast system boot.

Example hardware and firmware design details include a shared (e.g., L4) cache that is accessible by processor (e.g., CPU) as part of SRAM, overcome limited memory available at reset constraint (e.g., using category (1) embodiments above), and may bring a plurality (e.g., all) cores (e.g., boot strap processor (BSP) and application processors (APs)) from reset early and allocate resources for those cores (e.g., APs the same as the BSP) to perform parallel tasks. Certain embodiments herein disable/lockdown the (e.g., L4) cache range (e.g., cache used as boot SRAM) before booting to OS.

Figure 7A:
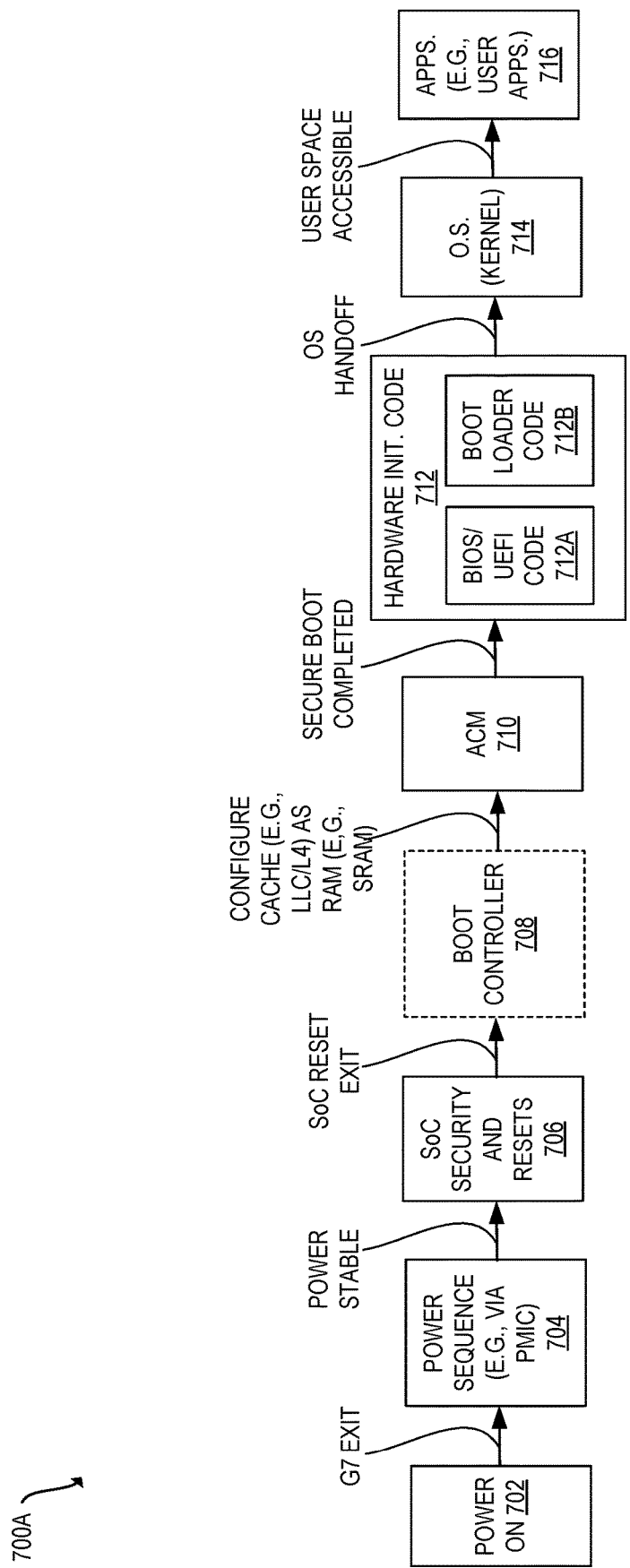
FIG. 7A illustrates an example boot flow according to embodiments of the disclosure.
Figure 7B:
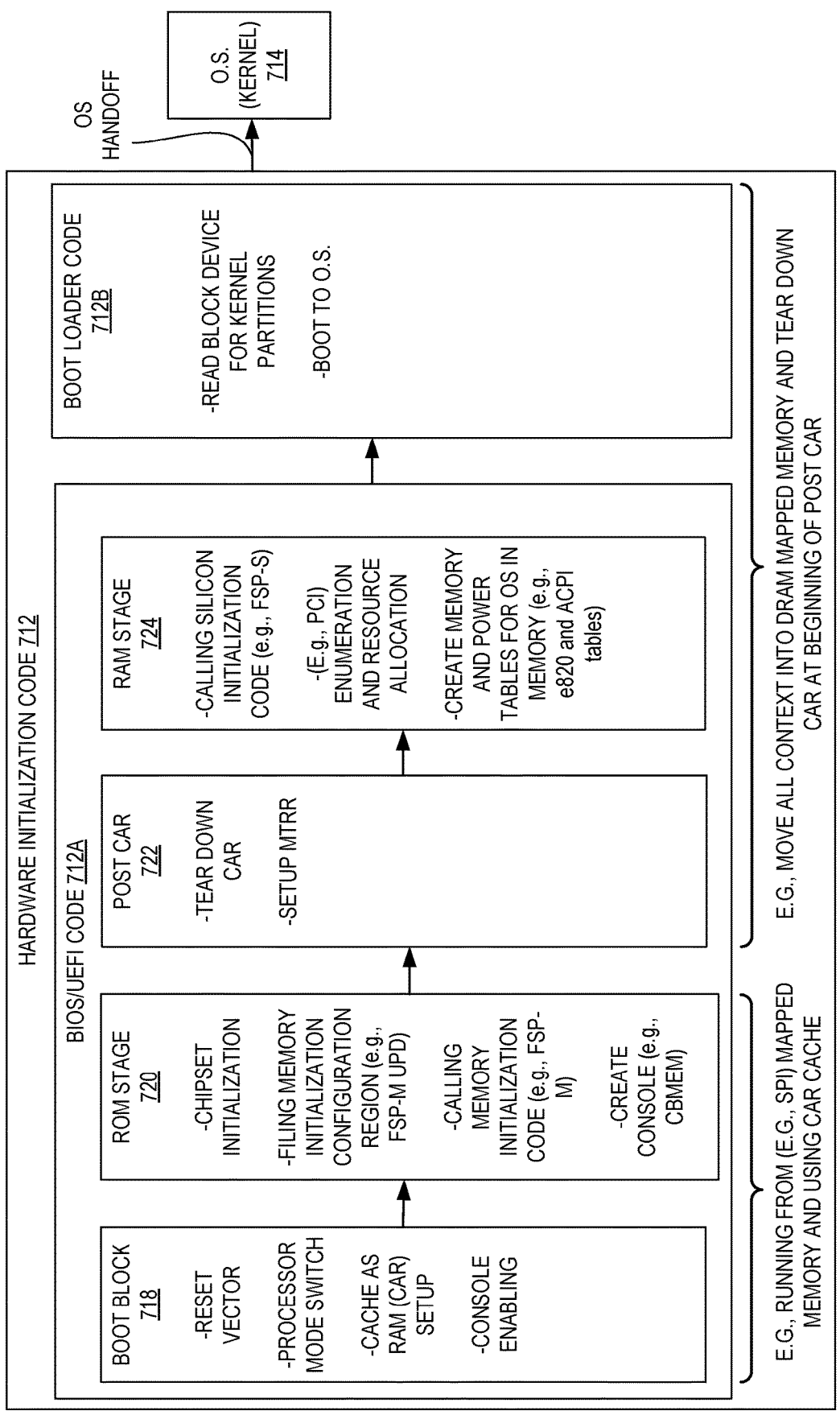
FIG. 7B illustrates an example flow for hardware initialization code of FIG. 7A without configuring cache (e.g., L4/LLC) as random-access memory (RAM) (e.g., SRAM) before running hardware initialization code according to embodiments of the disclosure.
Figure 7C:
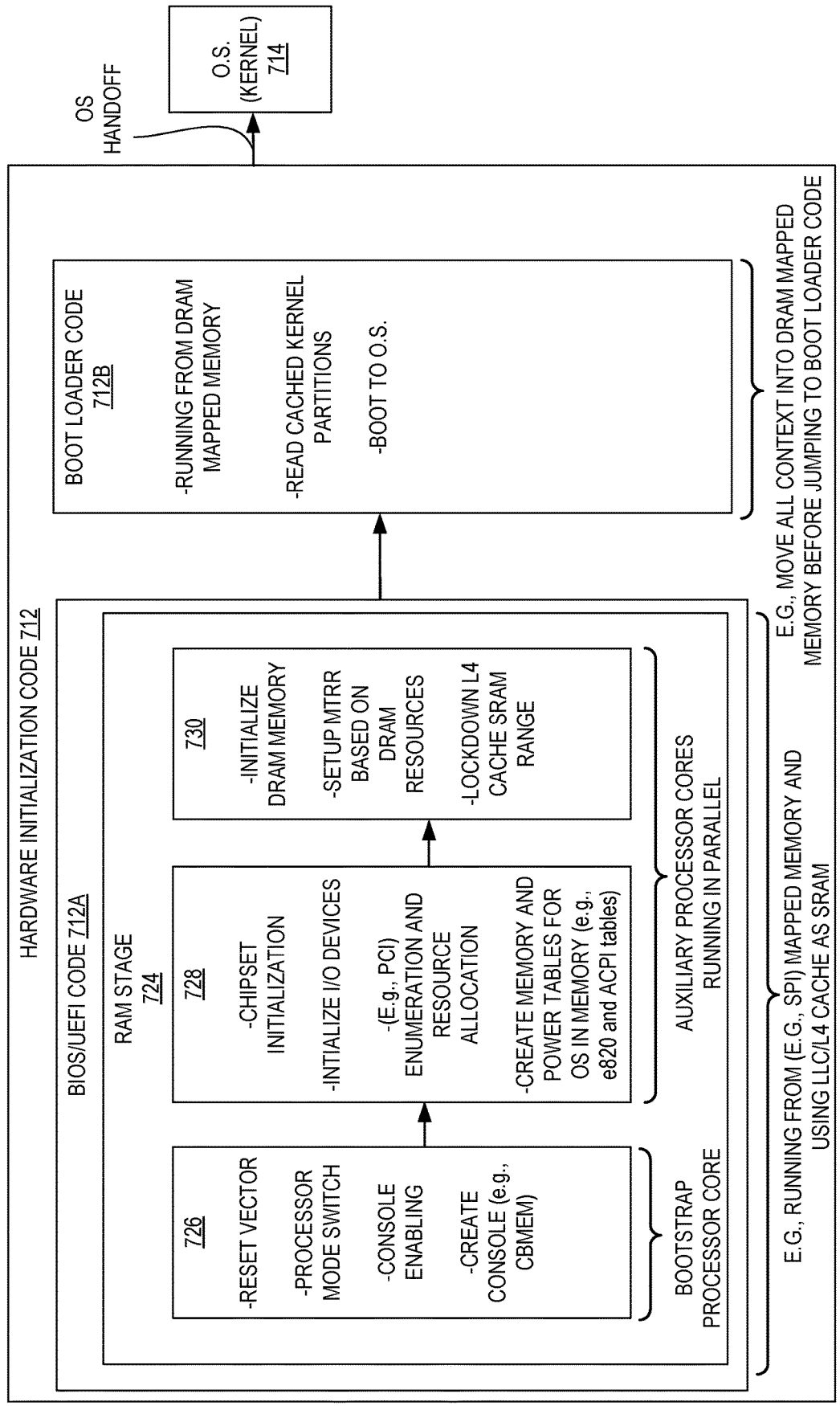
FIG. 7C illustrates an example flow for hardware initialization code of FIG. 7A with configuring cache (e.g., L4/LLC) as random-access memory (RAM) (e.g., SRAM) for use by a plurality of auxiliary processor cores before running hardware initialization code according to embodiments of the disclosure.

FIG. 7C discussed below illustrates a modified firmware boot flow of a system where (e.g., L4) cache is configured as SRAM at pre-reset and all cores (e.g., BSP and APs) are enabled at reset, e.g., without any memory constraint, to optimize hardware initialization code execution (e.g., boot stage) for faster boot process.

FIG. 7A illustrates an example boot flow 700A according to embodiments of the disclosure. Depicted flow 700A shows one embodiment of an architecture (e.g., Intel® architecture (IA)) platform boot path. For example, from an initial "mechanical off" state (e.g., ACPI G3) to a working state (for example, ACPI G0 sleep state S0 (e.g., working S0 state, and not S0 lower-power idle (e.g., "standby") or partial SoC sleep) boot time flow. The boot flow 700A may include the pre-power (for example, all rails and clock stabilization, e.g., real time clock (RTC)), pre-reset (e.g., power sequencing, reset/security, authenticated code module (ACM), microcode (ucode)/power management code (pcode), etc.), and post central processing unit (CPU) reset (e.g., boot loader) boot path components.

Depicted boot flow 700A includes receiving a power on at 702 (e.g., a G3 state exit), an initial power sequence 704 (e.g., as performed by a PMIC), SoC security and resets 706 (e.g., with the SoC (e.g., reset manager thereof) generating module reset signals based on reset requests from the various sources in the hardware processor system (e.g., processor 102) and any storage (e.g., storage 148), and software writing to the module-reset control registers, e.g., with the reset manager exiting SoC reset only when the secure fuses have been loaded and validated), optionally) boot controller 708 is to initialize a portion of a cache (e.g., L4 cache) for use by the hardware initialization code 712, authenticated code module 710 executed to ensure secure boot is completed, and then to hardware initialization code 712 (for example, such that BIOS and/or UEFI code 712A from storage 150 and boot loader code 712B from storage 152 are executed via use of the portion of the cache (e.g., L4 cache) initialized by boot controller 708, e.g., in parallel), after the OS handoff, the O.S. may then execute 714, and one or more (e.g., user) applications may then be executed 716 (e.g., under the control of the OS). Note that blocks 702-616 are merely examples and more or less blocks may be utilized in a boot flow.

FIG. 7B illustrates an example flow 700B for hardware initialization code of FIG. 7A without configuring cache (e.g., L4/LLC) as random-access memory (RAM) (e.g., SRAM) before running (e.g., entering) hardware initialization code 712 according to embodiments of the disclosure. In flow 700B, BIOS/UEFI code 712A includes a boot block 718, and ROM stage 720 (e.g., ROM being the hardware initialization storage 148 in FIG. 1), post cache-as-RAM (CAR) 722, and RAM stage 724 (e.g., for memory 106 in FIG. 1). For example, with boot block 718 including reset vector, processor mode switch, setting up CAR, and console enabling. For example, with ROM stage 720 including (e.g., processor) chipset initialization, filing memory initialization configuration regions (e.g., FSP-M UPD), calling memory initialization code (e.g., FSP-M), and creating a console (e.g., CBMEM). For example, with post CAR stage 722 including tearing down (e.g., removing) CAR and setting up memory type range registers (MTRRs). For example, with RAM stage 724 calling silicon initialization code (e.g., FSP-S), (e.g., PCI) enumeration and resource allocations, and creating memory and power tables for the OS in memory (e.g., e820 and ACPI tables).

In certain embodiments, once BIOS/UEFI code 712A has executed, it causes boot loader code 712B to execute. For example, boot loader code 712B executing to cause a read of block device for kernel partitions, and booting to OS.

In certain embodiments of FIG. 7B, boot block 718 and ROM stage 720 are run from mapped memory (e.g., according to a Serial Peripheral Interface (SPI) standard) and using CAR cache that is setup by BIOS/UEFI code 712A (e.g., boot block 718 thereof). In certain embodiments of FIG. 7B, post CAR 722 through boot loader code 712B utilize a move of all context into DRAM mapped memory and a tear down of CAR.

In the depicted embodiment, once the hardware initialization code 712 is complete, the OS handoff is performed to transfer control of the system (e.g., processor) to the OS 714 (e.g., OS kernel).

FIG. 7C illustrates an example flow 700C for hardware initialization code of FIG. 7A with configuring cache (e.g., L4/LLC) (e.g., by boot controller 708) as random-access memory (RAM) (e.g., SRAM) before running hardware initialization code 712 according to embodiments of the disclosure. In flow 700C, BIOS/UEFI code 712A includes a RAM stage 724. For example, with RAM stage 724 comprising a subblock 726 including reset vector, processor mode switch, console enabling, and creating a console (e.g., CBMEM), a subblock 728 including (e.g., processor) chipset initialization, initializing I/O devices, (e.g., PCI) enumeration and resource allocations, and creating memory and power tables for the OS in memory (e.g., e820 and ACPI tables), and subblock 730 including initializing DRAM memory, setting up MTRR based on DRAM resources, and locking down the portion of the (e.g., L4) cache used as memory for the hardware initialization code (e.g., SRAM range).

In certain embodiments, once BIOS/UEFI code 712A has executed, it causes boot loader code 712B to execute. For example, with boot loader code 712B to cause running from DRAM mapped memory, read of cached kernel partitions, and boot to OS.

In certain embodiments, RAM stage 724 is run from (e.g., SPI) mapped memory and using (e.g., L4) cache as memory (e.g., SRAM) and all context is moved into DRAM mapped memory before jumping to boot loader code 612B from BIOS/UEFI code 612A.

As one example, subblock 726 is executed by a (e.g., single) bootstrap processor core, and subblocks 728 and 730 are executed by auxiliary processor core(s), for example, with a first auxiliary processor core executing subblock 728 and a second auxiliary processor core executing subblock 730.

In the depicted embodiment, once the hardware initialization code 712 is complete, the OS handoff is performed to transfer control of the system (e.g., processor) to the OS 714 (e.g., OS kernel). An example security policy is to lock down that SRAM memory range used by the hardware initialization code before booting to operating system.

As one example, the embodiment of FIG. 7C results in a time savings compared to the embodiment depicted in FIG. 7B, and thus a faster boot.

Certain category (2) embodiments utilize a (e.g., larger than L1, L2, or L3 caches) pre-initialized memory at reset for hardware initialization code to utilize. Hardware initialization code (e.g., firmware) flows can be independent of DRAM memory training, e.g., which takes a longer time to initialize. Early hardware initialization code stages (e.g., before DRAM initialization) can be avoided in order to reduce hardware initialization code footprint. An auxiliary processor core and/or controller (e.g., microcontroller) inside the SoC can initialize the (e.g., L4) cache as SRAM, for example, without requiring use of a (e.g., IA) processor (e.g., BSP) core. In certain embodiments, memory (e.g., L4 cache) is available before any (e.g., processing) core is released from reset. Certain embodiments allow the loading of hardware initialization code (e.g., BIOS or UEFI) image into SRAM (e.g., implemented as L4 cache) even before any core is out from reset. Certain category (2) embodiments do not use cache-as-ram (CAR) ("tempRAM init") in hardware initialization code flow, e.g., to reduce complicated assembly programming in bootloader space. Certain category (2) embodiments allow CPU, chipset, and PCI enumeration to be performed early without being dependent over DRAM initialization, and instead make use of SRAM to do all CPU/chipset programming. Certain category (2) embodiments allow CAR tear down logic to be avoided. Certain category (2) embodiments avoid switching between temporary memory (e.g., CAR) to permanent memory (e.g., DRAM based) in boot (e.g., boot loader) space and entire boot loader execution can be driven out of SRAM based fixed memory. Certain category (2) embodiments perform DRAM initialization at end of hardware initialization code (e.g., boot loader) sequence, e.g., to ensure payload or OS can use DRAM based resources for higher memory requirement. Certain category (2) embodiments allow all cores to be available at reset and BSP may bring APs in operable condition early without any memory bottleneck. Certain category (2) embodiments allow hardware initialization code (e.g., BIOS/UEFI) to run on a multi-threaded (e.g., multiple core) environment. Certain category (2) embodiments allow the execution of a firmware support package (e.g., FSP-M for DRAM initialization and FSP-S for chipset initialization) over parallel threads to optimize boot time. Certain category (2) embodiments allow an entire hardware initialization code (e.g., firmware) boot sequence to be spread across all cores and execution happening over parallel threads, for example, (i) boot event of bootstrap processor (BSP) for handling reset vector, processor mode switching, console enabling, creating bootloader memory layout, and chipset initialization, (ii) boot event of one AP core (e.g., AP0, AP1 . . . APn, where n=index to the maximum core available) for filling required configuration parameter(s) to initialize DRAM, e.g., FSP-M, running memory reference code (MRC) to initialize DRAM, running independent security boot operations (e.g., verified boot), initializing independent I/O programming (e.g., embedded Multi-Media Controller (eMMC), trusted platform module (TPM), Embedded Controller, etc.), and (iii) Boot event of another AP core (e.g., AP0, AP1 . . . APn,) for filling required configuration parameter to initialize hardware blocks, e.g., FSP-S, running FSP-S for detailed chipset initialization, reading kernel partitions from block device use for booting OS, and locking down the portion of cache (e.g., L4 SRAM range) used by execution of the hardware initialization code for security compliance.

Figure 8:
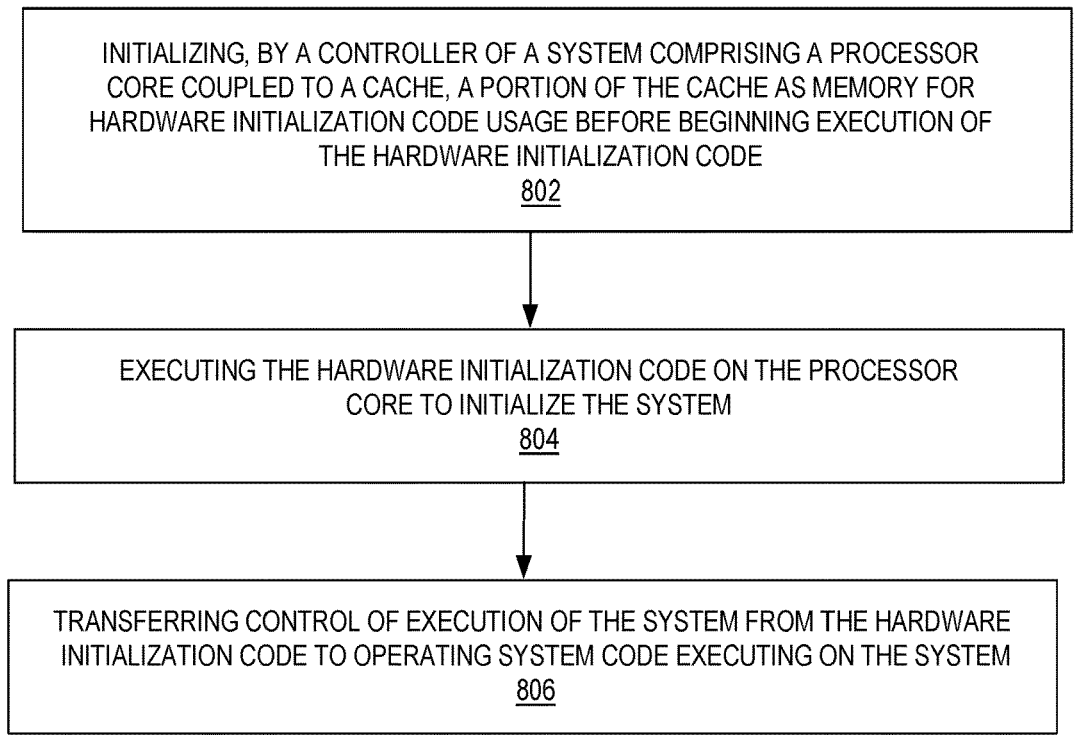
FIG. 8 is a flow diagram illustrating operations for system boot according to embodiments of the disclosure.

FIG. 8 is a flow diagram illustrating operations 800 for system boot according to embodiments of the disclosure. Some or all of the operations 800 (or other processes described herein, or variations, and/or combinations thereof) are performed under the control of one or more computer components configured to execute and are implemented as code (e.g., executable instructions, one or more computer programs, or one or more applications). The code is stored on a computer-readable storage medium, for example, in the form of a computer program comprising instructions executable by one or more processors. The computer-readable storage medium is non-transitory. In some embodiments, one or more (or all) of the operations 800 are performed by a boot service.

The operations 800 include, at block 802, initializing, by a controller of a system (e.g., in response to a power on of the system) comprising a processor core coupled to a cache, a portion of the cache as memory for hardware initialization code usage before beginning execution of the hardware initialization code. The operations 800 further include, at block 804, executing the hardware initialization code on the processor core to initialize the system. The operations 800 further include, at block 806, transferring control of execution of the system from the hardware initialization code to operating system code executing on the system.

Exemplary architectures, systems, etc. that the above may be used in are detailed below.

At least some embodiments of the disclosed technologies can be described in view of the following examples:

Example 1. A hardware processor comprising:
a processor core;
a cache coupled to the processor core; and
a controller circuit to initialize a portion of the cache as memory for hardware initialization code usage before beginning execution of the hardware initialization code after a power on of the hardware processor.

Example 2. The hardware processor of example 1, wherein the hardware initialization code is according to a Basic Input/Output System standard.

Example 3. The hardware processor of example 1, wherein the hardware initialization code is according to a Unified Extensible Firmware Interface standard.

Example 4. The hardware processor of example 1, wherein the processor core is one of a plurality of processor cores, and the hardware initialization code executes on the plurality of processor cores in parallel using the portion of the cache as the memory.

Example 5. The hardware processor of example 4, wherein the cache is shared by the plurality of processor cores and a graphics core.

Example 6. The hardware processor of example 1, wherein the controller circuit is to initialize the portion of the cache as byte read and write accessible memory for the hardware initialization code usage.

Example 7. The hardware processor of example 1, wherein the controller circuit is to cause the portion of the cache to be hidden from access by operating system code executing on the hardware processor.

Example 8. The hardware processor of example 1, wherein the controller circuit is to cause the portion of the cache to be hidden from access by user application code executing on the hardware processor.

Example 9. A non-transitory machine readable medium that stores code that when executed by a machine causes the machine to perform a method comprising:
initializing, by a controller of a system comprising a processor core coupled to a cache, a portion of the cache as memory for hardware initialization code usage before beginning execution of the hardware initialization code;
executing the hardware initialization code on the processor core to initialize the system; and
transferring control of execution of the system from the hardware initialization code to operating system code executing on the system.

Example 10. The non-transitory machine readable medium of example 9, wherein the hardware initialization code is according to a Basic Input/Output System standard.

Example 11. The non-transitory machine readable medium of example 9, wherein the hardware initialization code is according to a Unified Extensible Firmware Interface standard.

Example 12. The non-transitory machine readable medium of example 9, wherein the executing comprises executing the hardware initialization code on a plurality of processor cores that includes the processor core in parallel using the portion of the cache as the memory to initialize the system.

Example 13. The non-transitory machine readable medium of example 12, wherein the cache is shared by the plurality of processor cores and a graphics core.

Example 14. The non-transitory machine readable medium of example 9, wherein the initializing comprises initializing the portion of the cache as byte read and write accessible memory for the hardware initialization code usage.

Example 15. The non-transitory machine readable medium of example 9, wherein the method further comprises causing the portion of the cache to be hidden from access by operating system code executing on the system before the transferring control of execution of the system from the hardware initialization code to the operating system code.

Example 16. The non-transitory machine readable medium of example 9, wherein the method further comprises causing the portion of the cache to be hidden from access by user application code executing on the system before the transferring control of execution of the system from the hardware initialization code to the operating system code.

Example 17. A system comprising:
a hardware processor comprising a processor core;
a cache coupled to the hardware processor;
storage for hardware initialization code; and
a controller circuit to initialize a portion of the cache as memory for usage by the hardware initialization code before beginning execution of the hardware initialization code after a power on of the system.

Example 18. The system of example 17, wherein the hardware initialization code is according to a Basic Input/Output System standard.

Example 19. The system of example 17, wherein the hardware initialization code is according to a Unified Extensible Firmware Interface standard.

Example 20. The system of example 17, wherein the processor core is one of a plurality of processor cores, and the hardware initialization code executes on the plurality of processor cores in parallel using the portion of the cache as the memory.

Example 21. The system of example 20, further comprising a graphics core, and the cache is shared by the plurality of processor cores and the graphics core.

Example 22. The system of example 17, wherein the controller circuit is to initialize the portion of the cache as byte read and write accessible memory for usage by the hardware initialization code.

Example 23. The system of example 17, wherein the controller circuit is to cause the portion of the cache to be hidden from access by operating system code executing on the system.

Example 24. The system of example 17, wherein the controller circuit is to cause the portion of the cache to be hidden from access by user application code executing on the system.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary graphics processors are described next. Followed by exemplary core architectures, and descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macro-instructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory 980.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
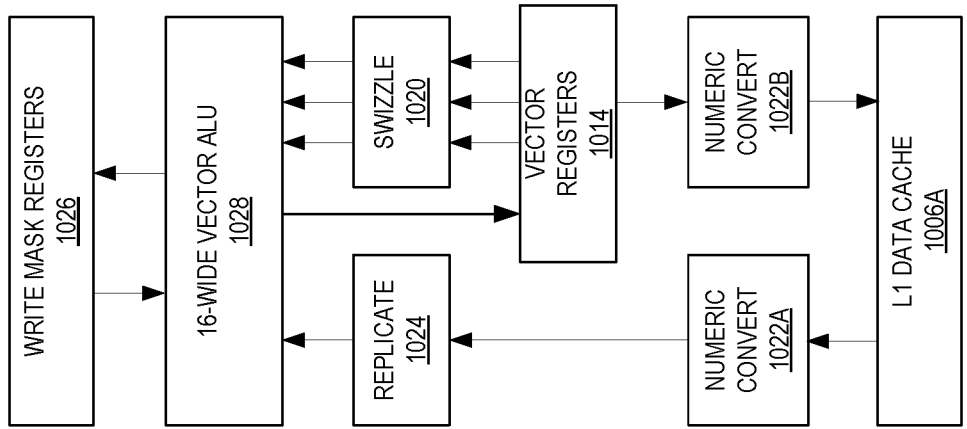
FIG. 10B is an expanded view of part of the processor core in FIG. 10A according to embodiments of the disclosure.
Figure 10A:
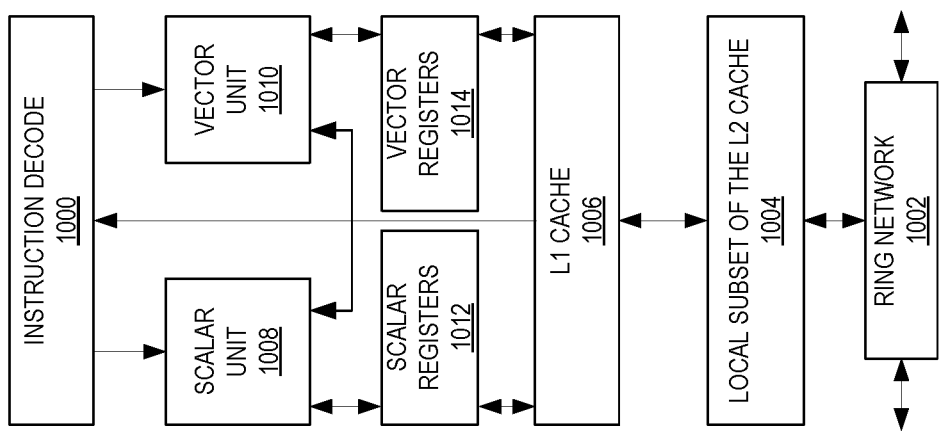
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
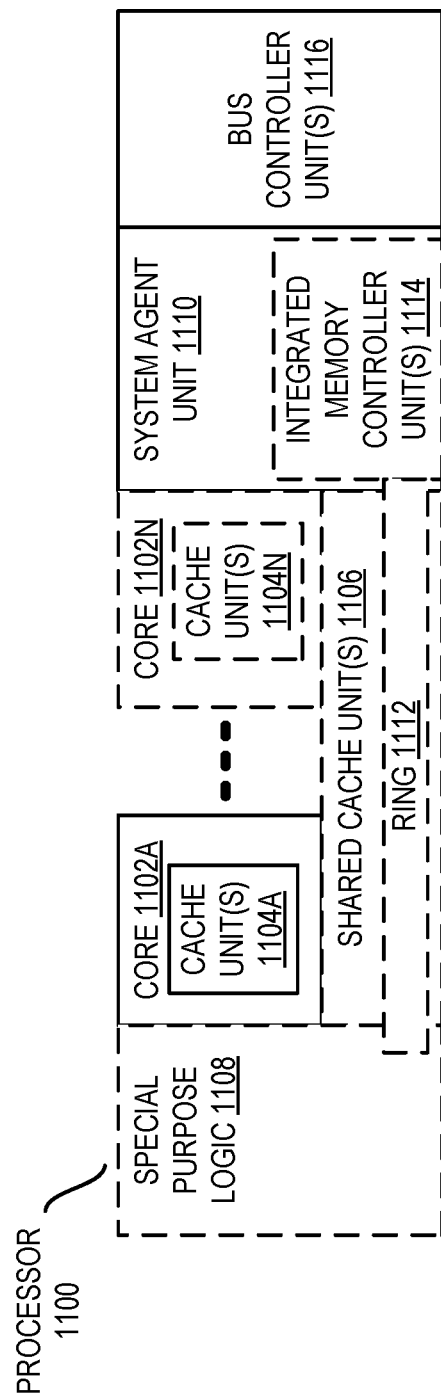
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
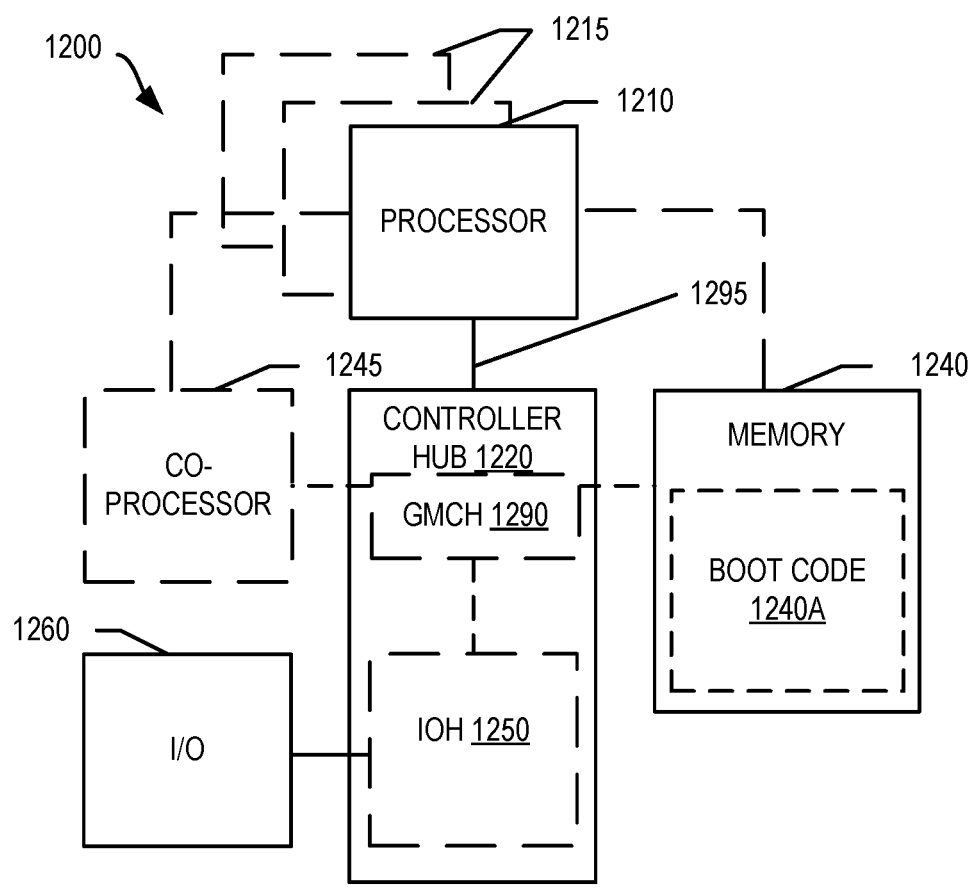
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include boot code 1240A, for example, to store code that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as Quickpath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
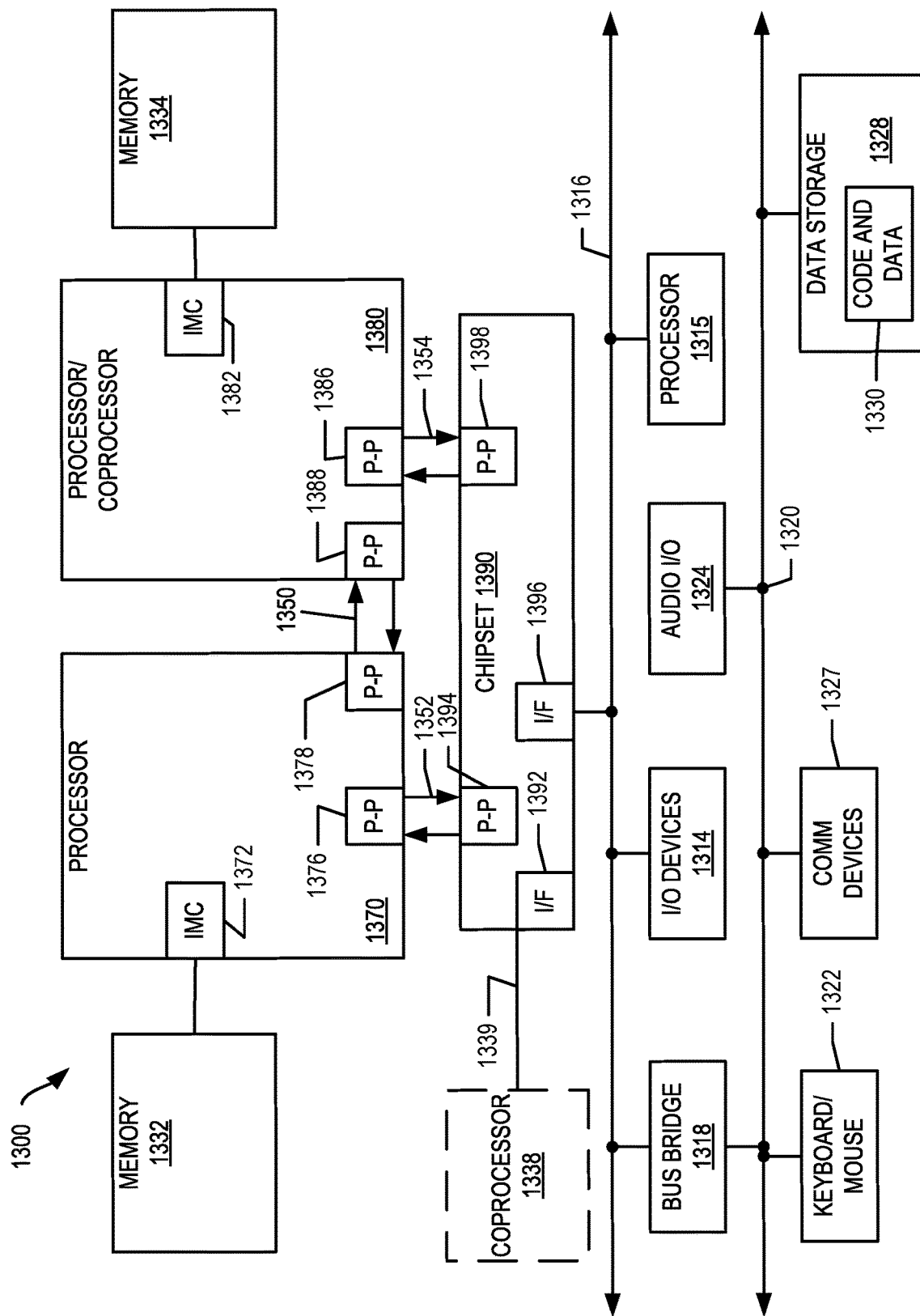
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
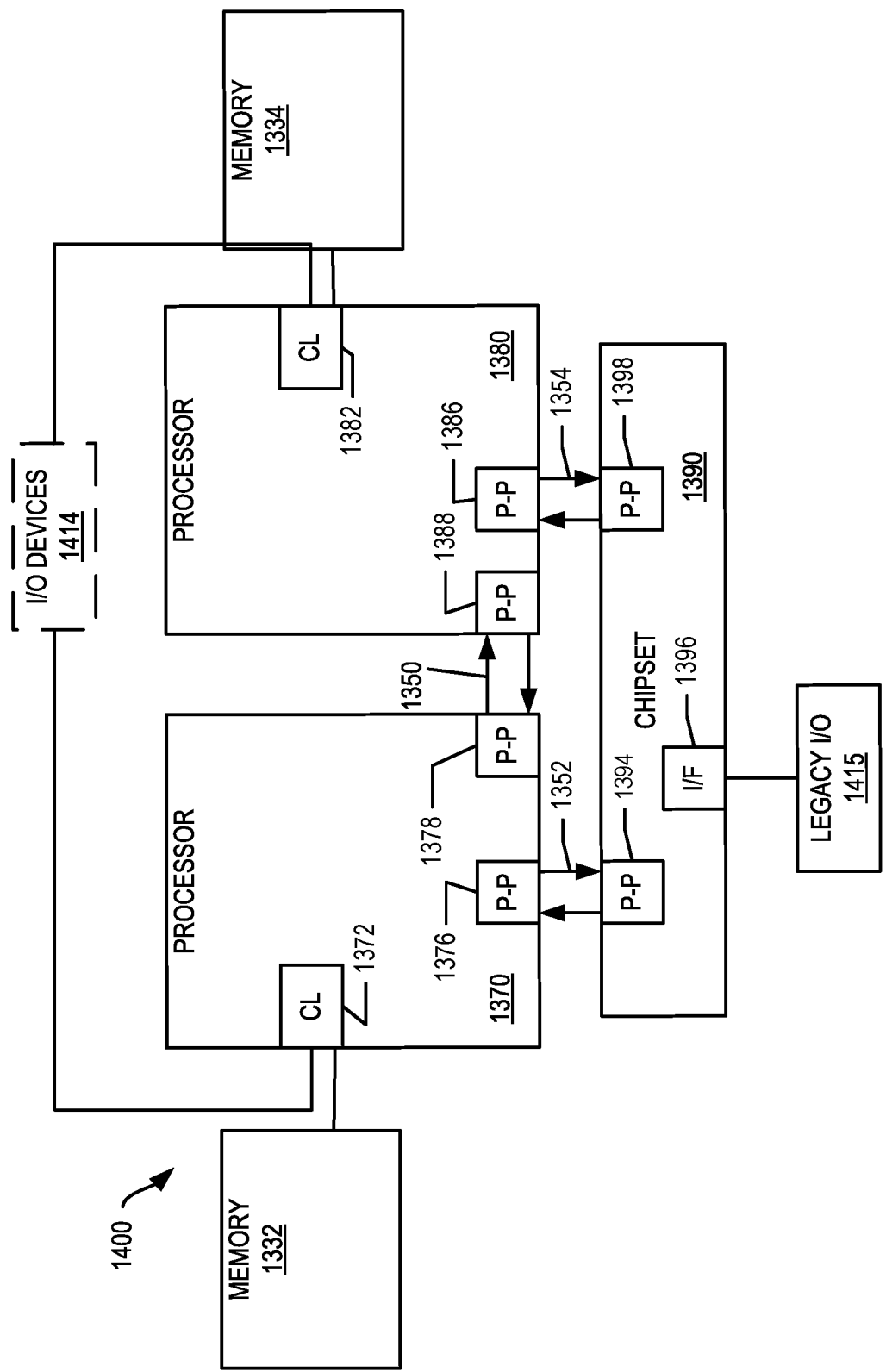
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
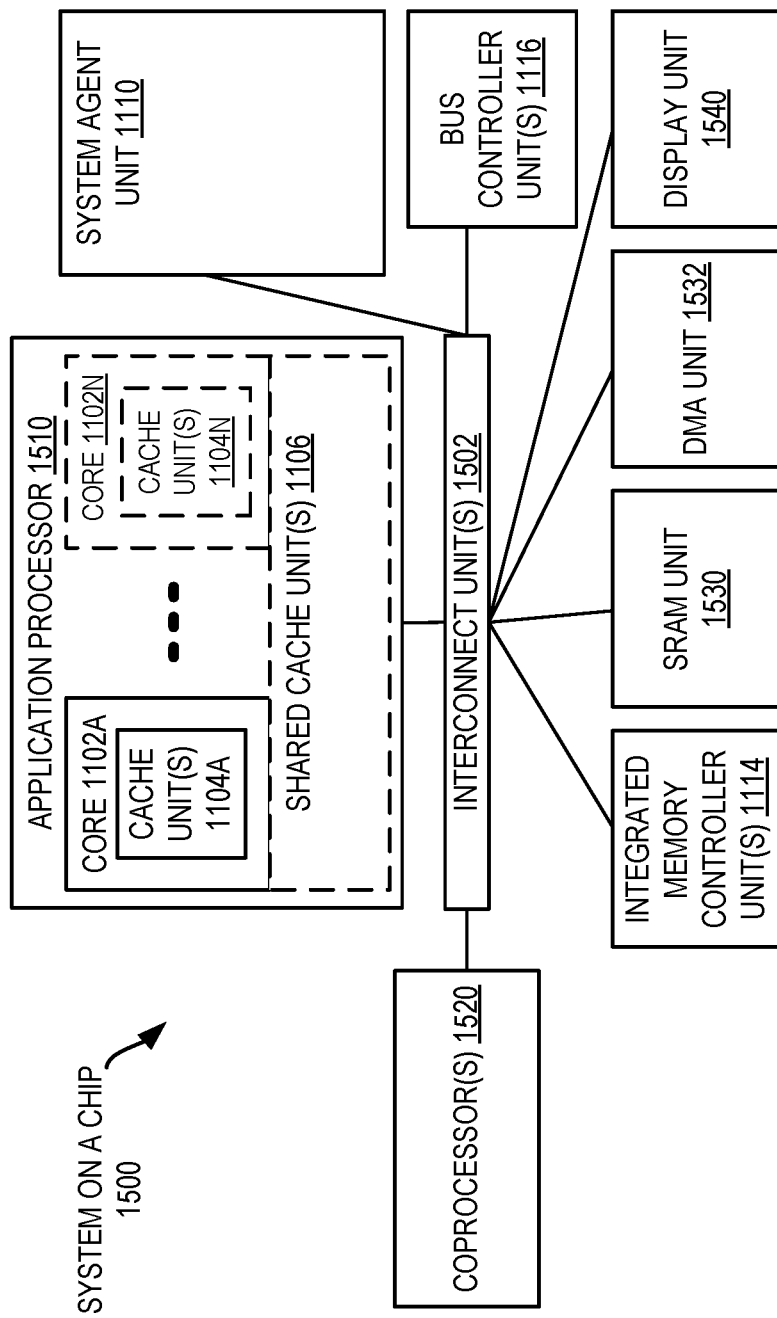
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
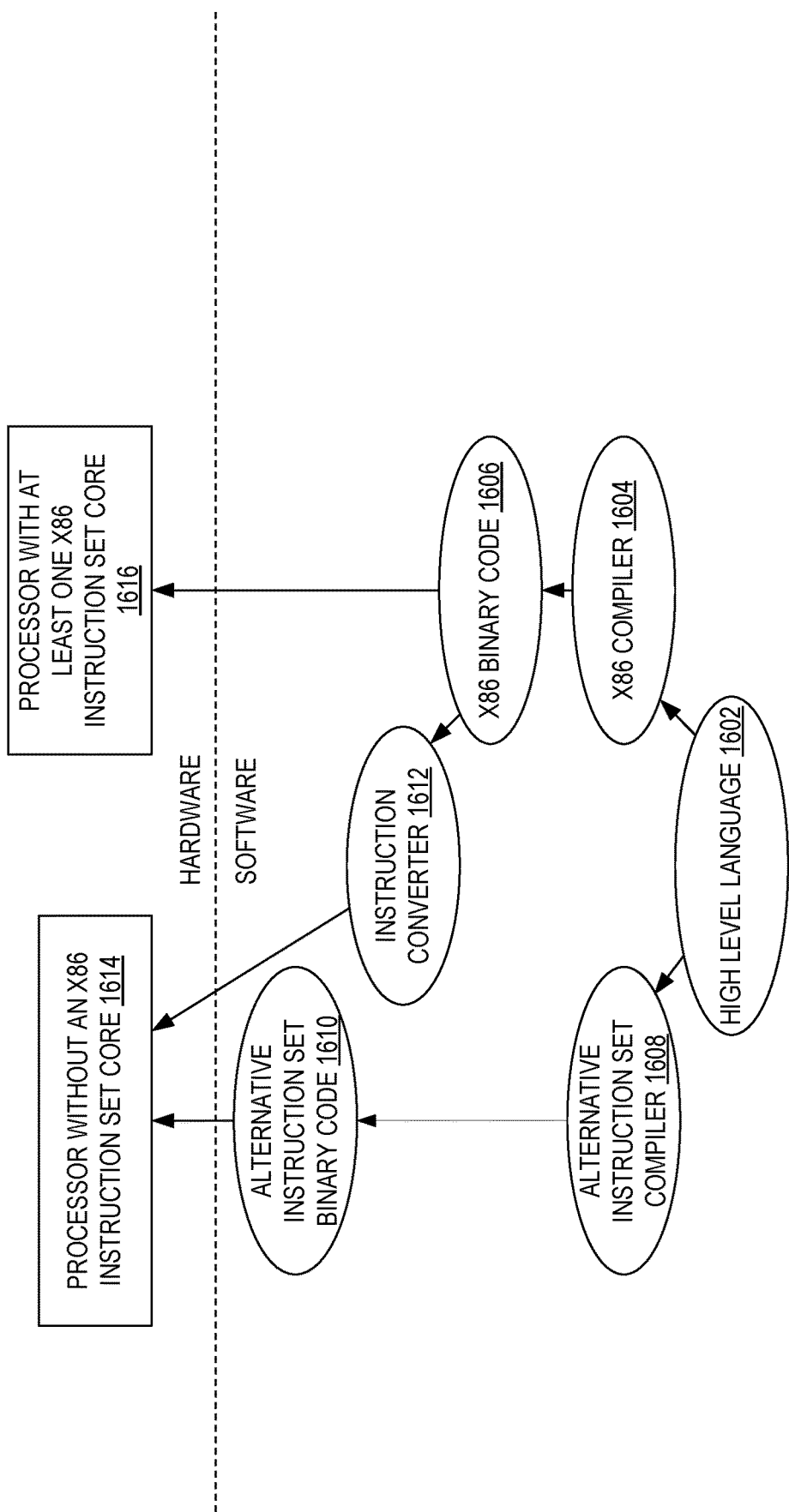
FIG. 16 is a block diagram contrasting the use of a software instruction converter to convert binary instructions in a source instruction set to binary instructions in a target instruction set according to embodiments of the disclosure.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. A hardware processor comprising:
a processor core;
a cache coupled to the processor core; and
a controller circuit to initialize a portion of the cache as memory for hardware initialization code usage before beginning execution of the hardware initialization code after a power on of the hardware processor, and provide an indication to the hardware initialization code of a start and a limit of the portion of the cache usable by the hardware initialization code.

2. The hardware processor of claim 1, wherein the hardware initialization code is according to a Basic Input/Output System standard.

3. The hardware processor of claim 1, wherein the hardware initialization code is according to a Unified Extensible Firmware Interface standard.

4. The hardware processor of claim 1, wherein the processor core is one of a plurality of processor cores, and the hardware initialization code executes on the plurality of processor cores in parallel using the portion of the cache as the memory.

5. The hardware processor of claim 4, wherein the cache is shared by the plurality of processor cores and a graphics core.

6. The hardware processor of claim 1, wherein the controller circuit is to initialize the portion of the cache as byte read and write accessible memory for the hardware initialization code usage.

7. The hardware processor of claim 1, wherein the controller circuit is to cause the portion of the cache to be hidden from access by operating system code and user application code executing on the hardware processor until a platform reset.

8. The hardware processor of claim 1, wherein the controller circuit is to store the indication in a register of the hardware processor.

9. A non-transitory machine readable medium that stores code that when executed by a machine causes the machine to perform a method comprising:
initializing, by a controller of a system comprising a processor core coupled to a cache, a portion of the cache as memory for hardware initialization code usage before beginning execution of the hardware initialization code;
providing an indication to the hardware initialization code of a start and a limit of the portion of the cache usable by the hardware initialization code;
executing the hardware initialization code on the processor core to initialize the system; and
transferring control of execution of the system from the hardware initialization code to operating system code executing on the system.

10. The non-transitory machine readable medium of claim 9, wherein the hardware initialization code is according to a Basic Input/Output System standard.

11. The non-transitory machine readable medium of claim 9, wherein the hardware initialization code is according to a Unified Extensible Firmware Interface standard.

12. The non-transitory machine readable medium of claim 9, wherein the executing comprises executing the hardware initialization code on a plurality of processor cores that includes the processor core in parallel using the portion of the cache as the memory to initialize the system.

13. The non-transitory machine readable medium of claim 12, wherein the cache is shared by the plurality of processor cores and a graphics core.

14. The non-transitory machine readable medium of claim 9, wherein the initializing comprises initializing the portion of the cache as byte read and write accessible memory for the hardware initialization code usage.

15. The non-transitory machine readable medium of claim 9, wherein the method further comprises causing the portion of the cache to be hidden from access by operating system code and user application code executing on the system before the transferring control of execution of the system from the hardware initialization code to the operating system code until a platform reset.

16. The non-transitory machine readable medium of claim 9, wherein the providing an indication comprises storing the indication in a register of the system.

17. A system comprising:
a hardware processor comprising a processor core;
a cache coupled to the hardware processor;
storage for hardware initialization code; and
a controller circuit to initialize a portion of the cache as memory for usage by the hardware initialization code before beginning execution of the hardware initialization code after a power on of the system, and provide an indication to the hardware initialization code of a start and a limit of the portion of the cache usable by the hardware initialization code.

18. The system of claim 17, wherein the hardware initialization code is according to a Basic Input/Output System standard.

19. The system of claim 17, wherein the hardware initialization code is according to a Unified Extensible Firmware Interface standard.

20. The system of claim 17, wherein the processor core is one of a plurality of processor cores, and the hardware initialization code executes on the plurality of processor cores in parallel using the portion of the cache as the memory.

21. The system of claim 20, further comprising a graphics core, and the cache is shared by the plurality of processor cores and the graphics core.

22. The system of claim 17, wherein the controller circuit is to initialize the portion of the cache as byte read and write accessible memory for usage by the hardware initialization code.

23. The system of claim 17, wherein the controller circuit is to cause the portion of the cache to be hidden from access by operating system code and user application code executing on the system until a platform reset.

24. The system of claim 17, wherein the controller circuit is to store the indication in a register of the system.

* * * * *